United States Patent
Wang et al.

(10) Patent No.: US 8,421,774 B2
(45) Date of Patent: Apr. 16, 2013

(54) SENSING CIRCUIT FOR USE WITH CAPACITIVE TOUCH PANEL

(75) Inventors: Hsin-Hao Wang, Tainan (TW); Yen-Lin Huang, Taipei (TW)

(73) Assignee: Orise Technology Co., Ltd., Hsinchu (TW)

( * ) Notice: Subject to any disclaimer, the term of this patent is extended or adjusted under 35 U.S.C. 154(b) by 259 days.

(21) Appl. No.: 12/977,233

(22) Filed: Dec. 23, 2010

(65) Prior Publication Data

US 2011/0157081 A1    Jun. 30, 2011

(30) Foreign Application Priority Data

Dec. 31, 2009  (TW) .................... 98146503 A

(51) Int. Cl.
*G06F 3/045* (2006.01)
(52) U.S. Cl.
USPC ............. 345/174; 345/173; 178/18.06
(58) Field of Classification Search .......... 345/173–179; 178/18.01–18.09
See application file for complete search history.

(56) References Cited

U.S. PATENT DOCUMENTS

| 5,565,658 | A | 10/1996 | Gerpheide et al. |
| 6,452,514 | B1 | 9/2002 | Philipp |
| 6,466,036 | B1 | 10/2002 | Philipp |
| 2007/0076897 | A1 | 4/2007 | Philipp |

*Primary Examiner* — Amare Mengistu
*Assistant Examiner* — Premal Patel
(74) *Attorney, Agent, or Firm* — WPAT PC; Justin King

(57) ABSTRACT

A sensing circuit of a capacitive touch panel includes a first switch, a second switch, a third switch, a feedback capacitor, a fourth switch and an operation amplifier. The first switch and the second switch have respective first ends connected with a receiving electrode. The third switch has a first end connected with a second end of the first switch. The feedback capacitor has a first end connected with the second end of the first switch. The fourth switch has a first end connected with a second end of the feedback capacitor. The operation amplifier has a positive input terminal connected with a ground terminal, a negative input terminal connected with the fourth switch, and an output terminal connected with the second, third and fourth switches. These switches are controlled during a driving cycle of the driving signal, so that an output voltage is outputted from the operation amplifier.

5 Claims, 24 Drawing Sheets

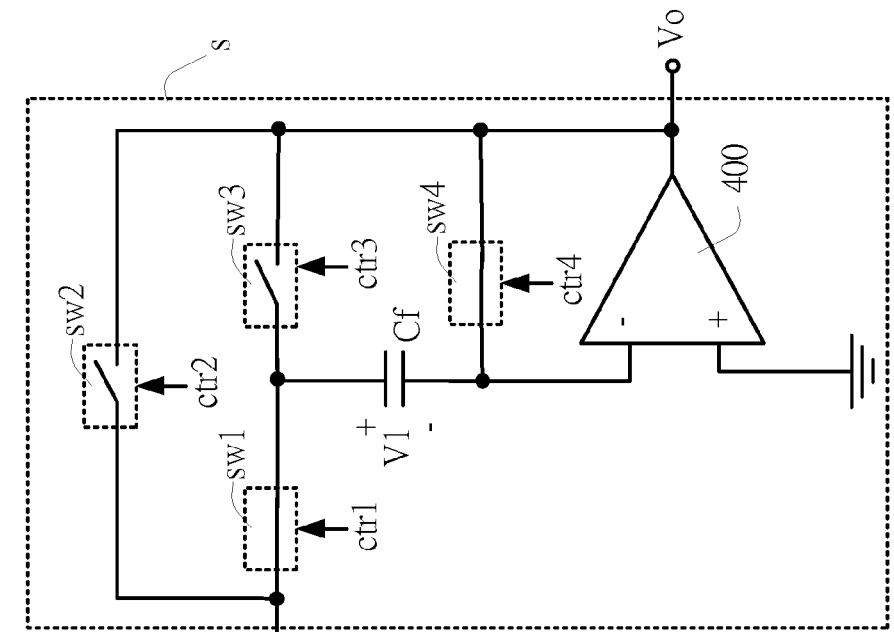
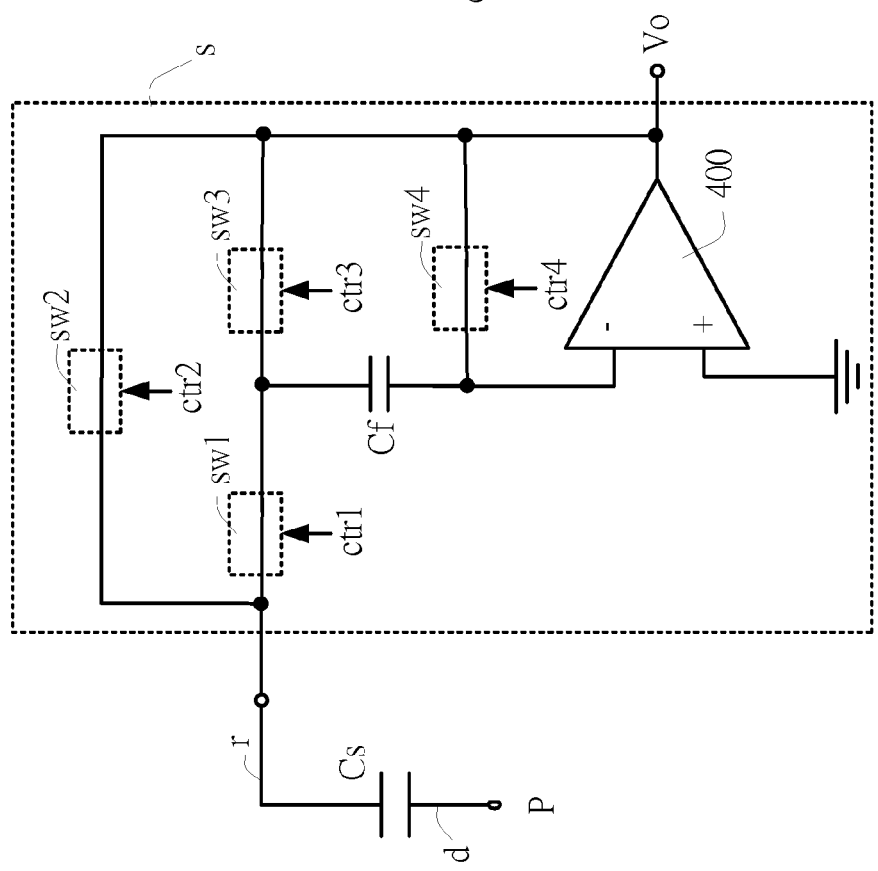
FIG. 5B
FIG. 5A

US 8,421,774 B2

SENSING CIRCUIT FOR USE WITH CAPACITIVE TOUCH PANEL

This application claims the benefit of Taiwan application Serial No. 98146503, filed Dec. 31, 2009, the subject matter of which is incorporated herein by reference.

FIELD OF THE INVENTION

The present invention relates to a sensing circuit for use with a touch panel, and more particularly to a sensing circuit for use with a capacitive touch panel.

BACKGROUND OF THE INVENTION

FIG. 1 is a schematic circuit diagram illustrating a capacitive touch panel system according to the prior art. As shown in FIG. 1, the capacitive touch panel system comprises plural driving units u1~u6, plural sensing circuits s1~s6 and a touch panel. The touch panel comprises plural driving electrodes d1~d6 and plural receiving electrodes r1~r6, which are not directly connected with each other. The driving electrodes d1~d6 are connected to output terminals of respective driving units u1~u6. The receiving electrodes r1~r6 are connected to input terminals of respective sensing circuits s1~s6. In addition, mutual capacitances Cs11~Cs66 are existed between the driving electrodes d1~d6 and respective receiving electrodes r1~r6. For clarification, six driving electrodes d1~d6 and six receiving electrodes r1~r6 or the touch panel are shown in FIG. 1. The capacitive touch panel with more driving electrodes and more receiving electrodes may have the similar configurations, and will not be redundantly described herein.

The capacitive touch panel of FIG. 1 is a multi-finger touch panel. When a conductive pointed object (e.g. a finger) touches the capacitive touch panel, the mutual capacitance value is changed. According to the change of the mutual capacitance value, a touched position is realized. Generally, once the finger of user is placed on a touch point of the capacitive touch panel, the mutual capacitance value at the touch point is changed. Meanwhile, a driving signal is sent to the corresponding mutual capacitance. In response to the driving signal, the electric quantity stored in the mutual capacitance is correspondingly changed. Based on this characteristic, the change of the electric quantity is detected by the sensing circuit. That is, according to the change of the voltage signal, the change of the mutual capacitance value is realized. According to the change of the mutual capacitance value, the sensing circuit may judge whether a pointed object approaches or touches the capacitive touch panel. Moreover, since the relationship between electric quantity (Q), voltage (V) and capacitance value (C) complies with the formula $Q=C \times V$, the sensing circuit may also provide a voltage change to a backend circuit. The backend circuit may realize the position of the touch point according to the voltage change.

Please refer to FIG. 1 again. The six driving signals P1~P6 will sequentially provide respective pulses to the driving electrodes d1~d6 through the driving units u1~u6. Since the mutual capacitances Cs11~Cs66 are existed between the driving electrodes d1~d6 and respective receiving electrodes r1~r6, the coupling charge of the mutual capacitances Cs11~Cs66 will be transmitted to the sensing circuits s1~s6 through the receiving electrodes r1~r6. As such, output voltages Vo1~Vo6 are respectively outputted from the sensing circuits s1~s6.

For example, the pulse of the first driving signal P1 generated in a driving cycle T will charge the mutual capacitances Cs11~Cs16, which are existed to the first driving electrode d1. In addition, the coupling charge of the mutual capacitances Cs11~Cs16 will be transmitted to the sensing circuits s1~s6 through the receiving electrodes r1~r6. Correspondingly, output voltages Vo1~Vo6 are respectively outputted from the sensing circuits s1~s6.

Assuming that the touch point is near the mutual capacitance Cs11, the output voltage Vo1 outputted from the first sensing circuit s1 is different from the output voltages Vo2~Vo6, which are respectively outputted from the sensing circuits s2~s6. Whereas, assuming that two touch points are respectively near the mutual capacitances Cs11 and Cs16, the output voltages Vo1 and Vo6 outputted from the first sensing circuit s1 and the sixth sensing circuit s6 are different from the output voltages Vo2~Vo5, which are respectively outputted from the sensing circuits s2~s5.

In the next driving cycles, the driving signals P2~P6 sequentially provide pulses to the driving electrodes d2~d6. Correspondingly, output voltages Vo1~Vo6 are respectively generated by the sensing circuits s1~s6.

In this example, these six driving cycles T are considered to constitute a scanning cycle τ. In other words, after the scanning cycle τ, all areas of the capacitive touch panel have been scanned once. As such, the position of the at least one touch point on the touch panel can be realized.

FIG. 2 is a schematic circuit diagram illustrating a sensing circuit of the capacitive touch panel system according to the prior art. As shown in FIG. 2, the sensing circuit s is implemented by an integrator. The sensing circuit s comprises an operation amplifier 200 and a feedback capacitor Cf. A reference voltage Vref is inputted into the positive input terminal (+) of the operation amplifier 200. Both terminals of the feedback capacitor Cf are respectively connected to the negative input terminal (−) and the output terminal Vo of the operation amplifier 200. In addition, the negative input terminal (−) of the operation amplifier 200 is also connected to the receiving electrode r. A mutual capacitance Cs is connected between the receiving electrode r and a driving electrode d.

During normal operation of the operation amplifier 200, the voltages inputted into the positive input terminal (+) and the negative input terminal (−) of the operation amplifier 200 are both equal to the reference voltage Vref. In a case that the amplitude of the pulse passing through the driving electrode d is Vy, a voltage change ΔVo at the output terminal Vo is obtained.

The voltage change ΔVo is calculated by the formula (I): $\Delta Vo = -Vy \times Cs/Ci$. Take the first driving signal P1 shown in FIG. 1 for example. In a case that no touch point is created, the mutual capacitance values of the mutual capacitances Cs11~Cs16 are unchanged, and thus the voltage changes at the output terminals Vo1~Vo6 of the sensing circuits s1~s6 are identical. On the other hand, when the touch point is near the mutual capacitance Cs11, the mutual capacitance value of the mutual capacitance Cs11 is changed, and thus the voltage change at the output terminal Vo1 of the first sensing circuit s1 is different from the voltage changes at the output terminals Vo2~Vo6 of the sensing circuit s2~s6. According to the voltage changes at the output terminals Vo1~Vo6 of the sensing circuit s1~s6, the backend circuit may realize the position of the touch point.

However, if the change of the mutual capacitance value of the mutual capacitance Cs at the touch point is very small, the coupling charge of the mutual capacitance Cs is slightly different from the coupling charge of other mutual capacitances. As such, the voltage change generated by the sensing circuit corresponding to the touch point is slightly different from the voltage changes generated by other sensing circuits. Under this circumstance, the backend circuit fails to realize the position of the touch point according to the change of the voltage change.

FIG. 3 is a schematic circuit diagram illustrating another capacitive touch panel system according to the prior art. As shown in FIG. 3, since each of the driving signals P1~P6 has two sub-driving cycles (t1, t2) during each driving cycle T, the coupling charge of the mutual capacitances of the capacitive touch panel 300 can be generated in several times. In other words, the sensing circuits s1~s6 may be designed to accumulate the coupling charge of the mutual capacitances in several times. As such, the output voltages Vo1~Vo6 from the sensing circuits s1~s6 will be easily distinguishable.

As shown in FIG. 3, a scanning cycle τ includes six driving cycles T, and each of the driving signals P1~P6 generates two pulses during the sub-driving cycles t1 and t2, respectively. In such way, the coupling charge of the mutual capacitances will be generated in several times. The sensing circuits s1~s6 are designed to accumulate the coupling charge of the mutual capacitances in several times and generate a higher voltage change for determining the position of the touch point. In other words, after the scanning cycle τ, all areas of the capacitive touch panel have been scanned once. Consequently, the position of the at least one touch point on the touch panel can be accurately realized.

For clarification, as shown in FIG. 3, two sub-driving cycles (t1, t2) are included in each driving cycle T. It is noted that more than two sub-driving cycles may be included and more than two pulses may be generated during each driving cycle T. As such, the sensing circuits s1~s6 generate a higher voltage change. The use of multiple pulses to accumulate the coupling charge of the mutual capacitances is disclosed in for example U.S. Pat. No. 6,452,514, which is entitled "Capacitive sensor and array".

SUMMARY OF THE INVENTION

In accordance with an aspect, the present invention provides a sensing circuit for a capacitive touch panel. The sensing circuit is connected with a receiving electrode of the capacitive touch panel. A mutual capacitance is existed between a driving electrode of the capacitive touch panel and the receiving electrode. The driving electrode receives a driving signal. The sensing circuit includes a first switch, a second switch, a third switch, a feedback capacitor, a fourth switch and an operation amplifier. The first switch has a first end connected with the receiving electrode. The second switch has a first end connected with the receiving electrode. The third switch has a first end connected with a second end of the first switch. The feedback capacitor has a first end connected with the second end of the first switch. The fourth switch has a first end connected with a second end of the feedback capacitor. The operation amplifier has a positive input terminal connected with a ground terminal, a negative input terminal connected with the first end of the fourth switch, and an output terminal connected with a second end of the second switch, a second end of the third switch and a second end of the fourth switch. A driving cycle of the driving signal includes N sub-driving cycles, where N is an integer. During high-level time intervals of the N sub-driving cycles, the first switch and the fourth switch are in the close state, and the second switch and the third switch are in the open state. During low-level time intervals of the N sub-driving cycles, the first switch and the fourth switch are in the open state, and the second switch and the third switch are in the close state. Consequently, an output voltage is outputted from the output terminal of the operation amplifier during the low-level time interval of the $N^{th}$ sub-driving cycle.

In accordance with another aspect, the present invention provides a sensing circuit for a capacitive touch panel. The sensing circuit is connected with a receiving electrode of the capacitive touch panel. A mutual capacitance is connected between a driving electrode of the capacitive touch panel and the receiving electrode. The driving electrode receives a driving signal. The sensing circuit includes a first switch, a second switch, a third switch, a feedback capacitor, a fourth switch and an operation amplifier. The first switch has a first end connected with the receiving electrode. The second switch has a first end connected with the receiving electrode. The third switch has a first end connected with a second end of the first switch. The feedback capacitor has a first end connected with the second end of the first switch. The fourth switch has a first end connected with a second end of the feedback capacitor. The operation amplifier has a positive input terminal connected with a ground terminal, a negative input terminal connected with the first end of the fourth switch, and an output terminal connected with a second end of the second switch, a second end of the third switch and a second end of the fourth switch. A driving cycle of the driving signal includes N sub-driving cycles, where N is an integer. Each of the N sub-driving cycles includes a first phase, a second phase, a third phase and a fourth phase. During the first phase, the driving signal is in a floating condition, the first switch and the second switch are in the open state, and the third switch and the fourth switch are in the close state. During the second phase, the driving signal is a low-level voltage, the first switch and the fourth switch are in the close state, and the second switch and the third switch are in the open state. During the third phase, the driving signal is a high-level voltage, the first switch and the fourth switch are in the close state, and the second switch and the third switch are in the open state. During the fourth phase, the driving signal is the low-level voltage, the first switch and the fourth switch are in the open state, and the second switch and the third switch are in the close state. Consequently, an output voltage is outputted from the output terminal of the operation amplifier during the fourth phase of the $N^{th}$ sub-driving cycle.

In accordance with a further aspect, the present invention provides a sensing circuit for a capacitive touch panel. The sensing circuit is connected with a receiving electrode of the capacitive touch panel. A mutual capacitance is connected between a driving electrode of the capacitive touch panel and the receiving electrode. The driving electrode is connected to a ground terminal. The sensing circuit includes a first switch, a second switch, a third switch, a feedback capacitor, a fourth switch, an operation amplifier, a fifth switch and a sixth switch. The first switch has a first end connected with the receiving electrode. The second switch has a first end connected with the receiving electrode. The third switch has a first end connected with a second end of the first switch. The feedback capacitor has a first end connected with the second end of the first switch. The operation amplifier has a positive input terminal connected with the ground terminal, a negative input terminal connected with a first end of the fourth switch, and an output terminal connected with a second end of the second switch, a second end of the third switch and a second end of the fourth switch. The fifth switch has a first end connected with a voltage source and a second end connected with a second end of the feedback capacitor. The sixth switch has a first end connected with the second end of the feedback capacitor and a second end connected with the first end of the fourth switch. A driving cycle of the driving signal includes N sub-driving cycles, where N is an integer. Each of the N sub-driving cycles includes a first phase and a second phase. During the first phase, the first switch, the fourth switch and the fifth switch are in the close state, and the second switch, the third switch and the sixth switch are in the open state. During the second phase, the first switch, the fourth switch and the fifth switch are in the open state, and the second switch, the third switch and the sixth switch are in the close state. Consequently, an output voltage is outputted from the output terminal of the operation amplifier during the second phase of the $N^{th}$ sub-driving cycle.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 5A~5G are schematic circuit diagrams illustrating the operations of the sensing circuit according to the first embodiment of the present invention;

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
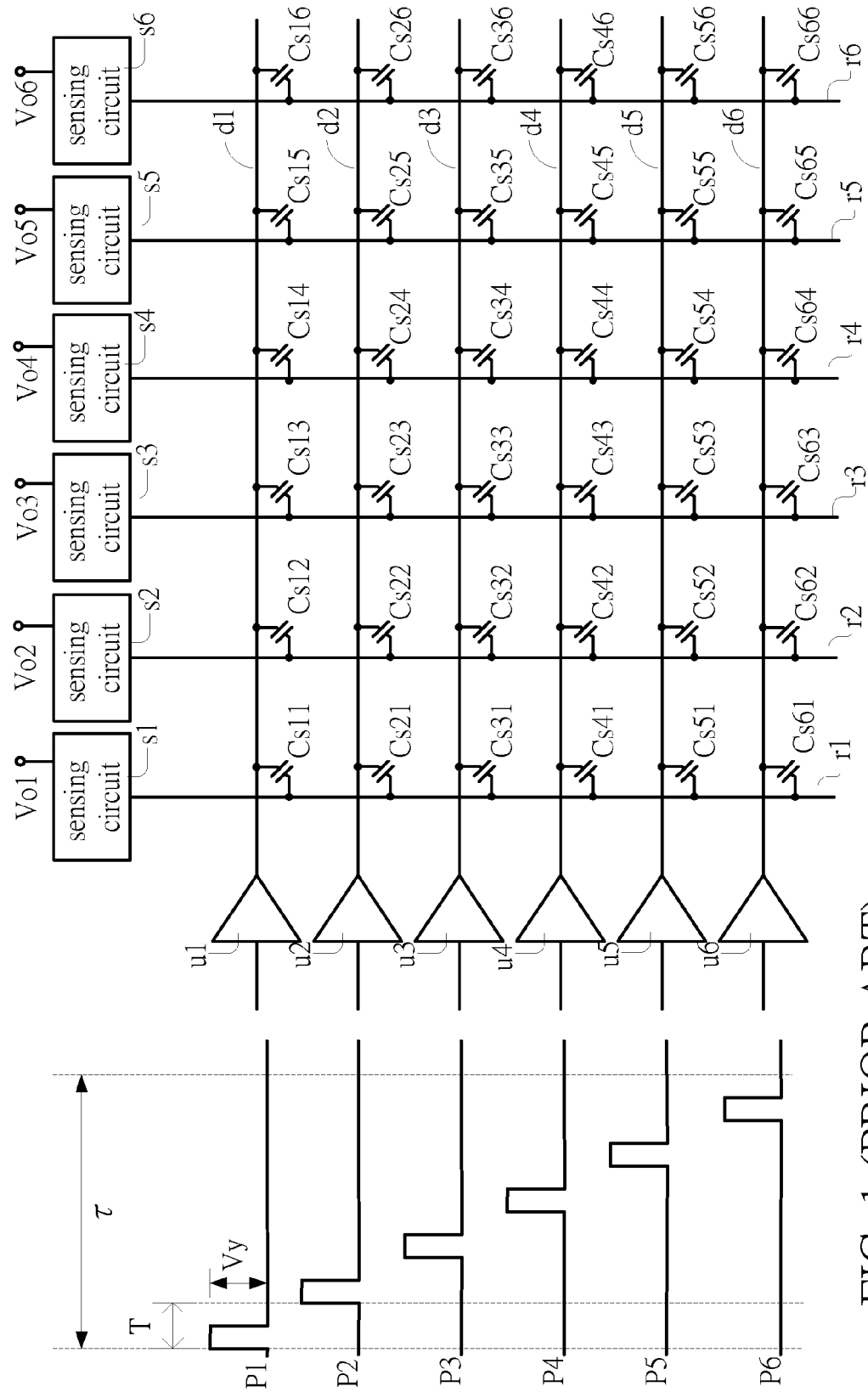
FIG. 1 is a schematic circuit diagram illustrating a capacitive touch panel system according to the prior art.
Figure 2:
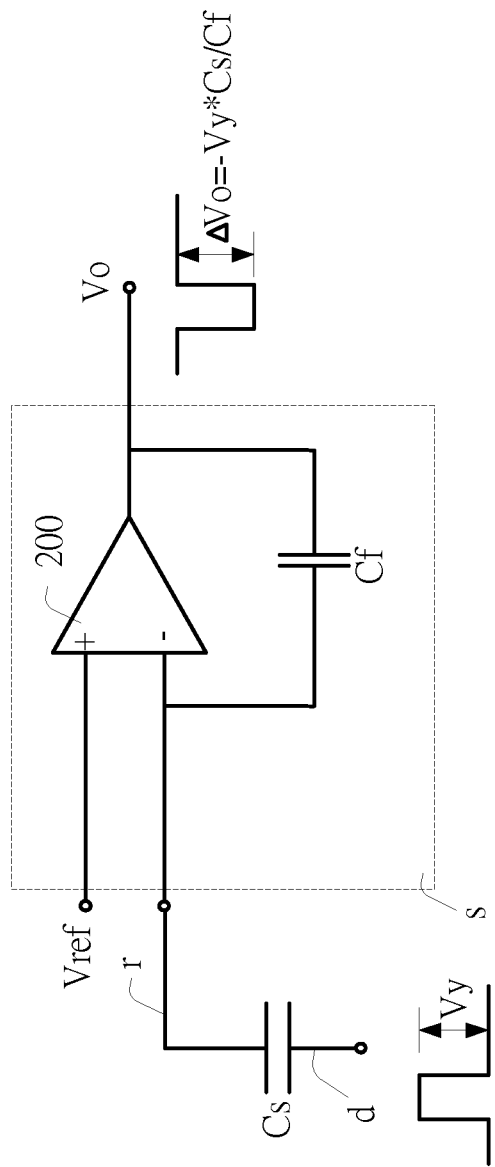
FIG. 2 is a schematic circuit diagram illustrating a sensing circuit of the capacitive touch panel system according to the prior art.
Figure 3:
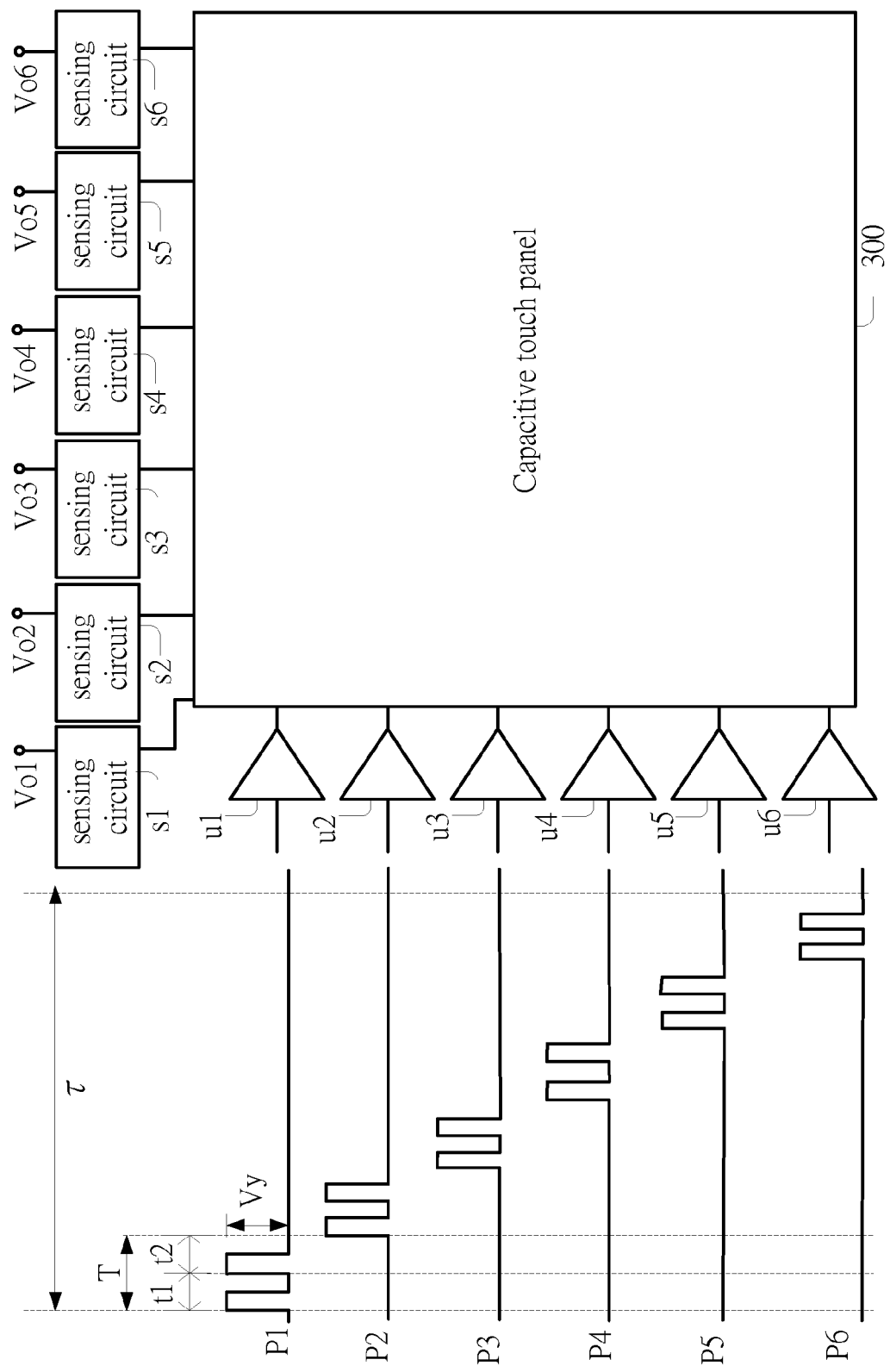
FIG. 3 is a schematic circuit diagram illustrating another capacitive touch panel system according to the prior art.
Figure 4A:
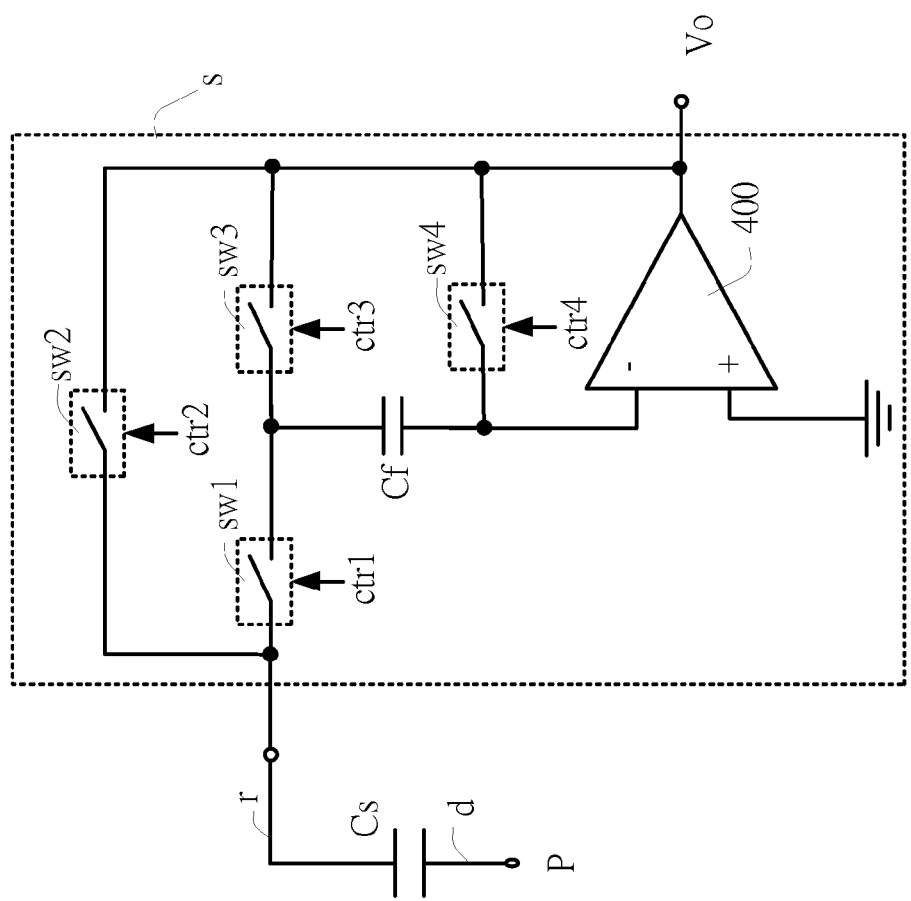
FIG. 4A is a schematic circuit diagram illustrating a sensing circuit according to a first embodiment of the present invention.
Figure 4B:
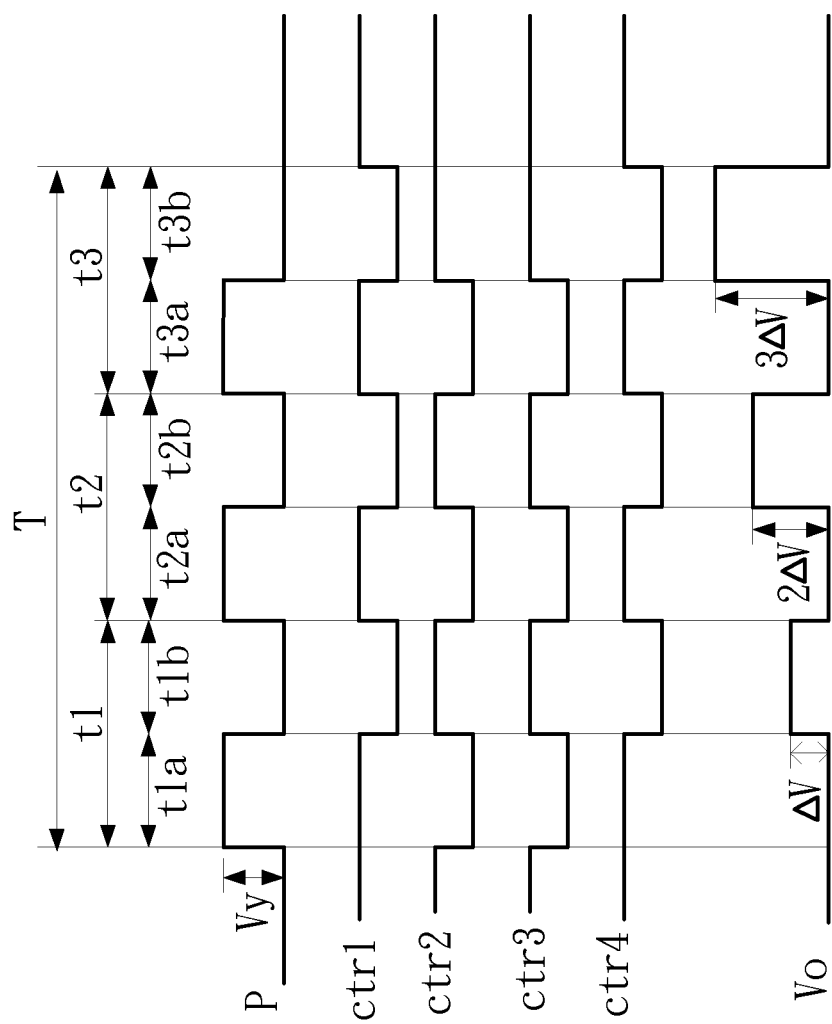
FIG. 4B is a schematic timing waveform diagram illustrating associated control signals used in the sensing circuit shown in FIG. 4A.

FIG. 4A is a schematic circuit diagram illustrating a sensing circuit according to a first embodiment of the present invention. FIG. 4B is a schematic timing waveform diagram illustrating associated control signals used in the sensing circuit shown in FIG. 4A. Please refer to FIGS. 4A and 4B. The sensing circuit s comprises an operation amplifier 400, a feedback capacitor Cf and four switches sw1~sw4. When a driving signal P is transmitted to the driving electrode d, a mutual capacitance Cs generates coupling charge. The coupling charge is transmitted to an input terminal of the sensing circuit s via a receiving electrode r. Moreover, the first switch sw1, the second switch sw2, the third switch sw3 and the fourth switch sw4 are controlled according to a first control signal ctr1, a second control signal ctr2, a third control signal ctr3 and a fourth control signal ctr4, respectively.

The input terminal of the sensing circuit s is connected with the first end of the first switch sw1 and the first end of the second switch sw2. The second end of the first switch sw1 is connected with the first end of the third switch sw3 and the first end of the feedback capacitor Cf. The negative input terminal (−) of the operation amplifier 400 is connected with the second end of the feedback capacitor Cf and the first end of the fourth switch sw4. The positive input terminal (+) of the operation amplifier 400 is connected with a ground terminal GND. The output terminal of the operation amplifier 400 is the output terminal Vo of the sensing circuit s. In addition, the output terminal of the operation amplifier 400 is connected with the second ends of the second switch sw2, the third switch sw3 and the fourth switch sw4.

As shown in FIG. 4B, a scanning cycle τ of the driving signal P comprises a reset cycle and a driving cycle T. The driving cycle T of the driving signal P comprises three sub-driving cycles (t1, t2, t3), and driving cycle T of the driving signal P, three pulses are generated correspondingly. The remaindering time is the reset cycle. In response to the high-level states of the four control signals ctr1~ctr4, the switches sw1~sw4 are in the close states. Whereas, in response to the low-level states of the four control signals ctr1~ctr4, the switches sw1~sw4 are in the open states. For clarification, only three pulses generated during each driving cycle T are shown in FIG. 4B. It is noted that the numbers of the sub-driving cycles and the pulses may be varied according to the practical requirements.

Hereinafter, the operations of the sensing circuit s according to the first embodiment will be illustrated in more details with reference to FIGS. 4 and 5. FIGS. 5A~5G are schematic circuit diagrams illustrating the operations of the sensing circuit according to the first embodiment of the present invention.

In FIG. 5A, the sensing current is operated during the reset cycle. During the reset cycle, all of the switches sw1~sw4 are in the close state. Since there is no pulse of the driving signal P generated during the reset cycle and the both terminals of the feedback capacitor Cf and the both terminals of the mutual capacitance Cs are short-circuited. That means, the charge quantity stored in the feedback capacitor Cf and the mutual capacitance Cs will be zero. Under this circumstance, the operation amplifier 400 is used as a unit gain amplifier, and thus the voltage outputted from the output terminal Vo is zero.

In FIG. 5B, the sensing circuit is operated during a high-level time interval t1a of a first sub-driving cycle t1 of the driving cycle T. Please refer to FIGS. 4B and 5B. During the high-level time interval t1a of the first sub-driving cycle t1, the first switch sw1 and the fourth switch sw4 are in the close state, and the second switch sw2 and the third switch sw3 are in the open state. The operation amplifier 400 is used as a unit gain amplifier, and thus the voltage outputted from the output terminal Vo is zero. In a case that the pulse amplitude of the driving signal P is Vy, the voltage across the feedback capacitor Cf is calculated by the following formula:

$$V1 = \left(\frac{Cs}{Cs+Cf}\right)Vy$$

Figure 5D:
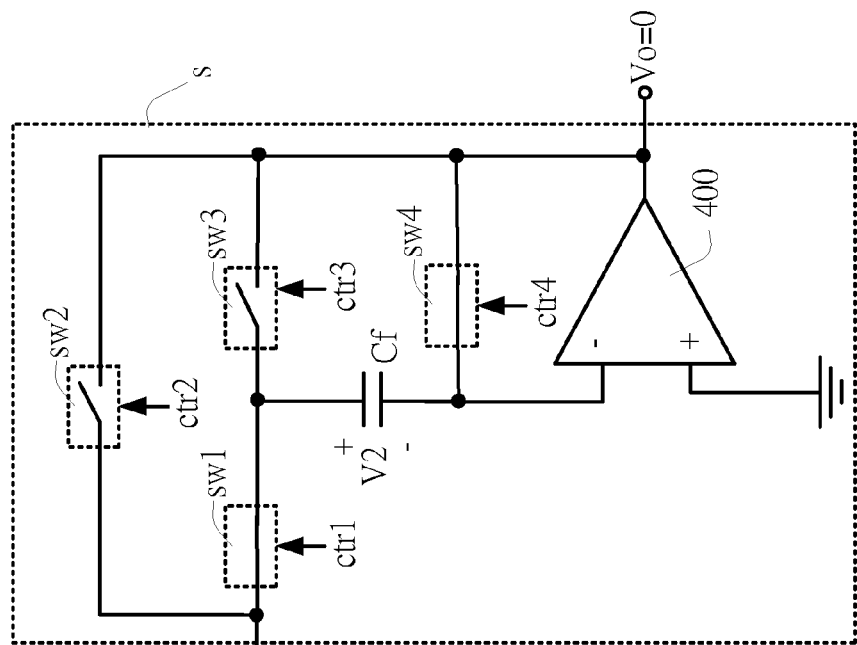
Figure 5C:
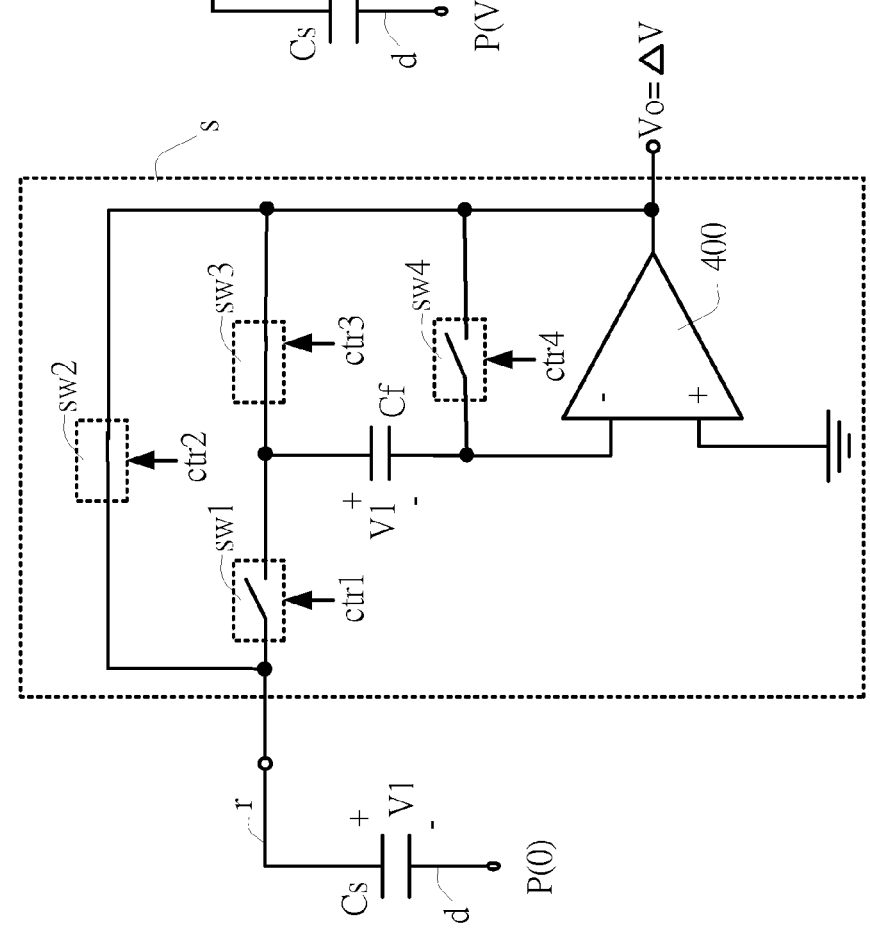

In FIG. 5C, the sensing circuit is operated during a low-level time interval t1b of the first sub-driving cycle t1 of the driving cycle T. Please refer to FIGS. 4B and 5C. During the low-level time interval t1b of the first sub-driving cycle t1, the second switch sw2 and the third switch sw3 are in the close state, and the first switch sw1 and the fourth switch sw4 are in the open state. Meanwhile, the voltage outputted from the output terminal Vo of the operation amplifier 400 is calculated by the following formula:

$$V1 = \Delta V = \left(\frac{Cs}{Cs+Cf}\right)Vy$$

Since the voltage of the driving signal P is zero, the voltage across the mutual capacitance Cs is also V1. Meanwhile, the charge quantity stored in the mutual capacitance Cs is equal to Cs×V1, and the charge quantity stored in the feedback capacitor Cf is equal to Cf×V1.

In FIG. 5D, the sensing circuit is operated during a high-level time interval t2a of a second sub-driving cycle t2 of the driving cycle T. Please refer to FIGS. 4B and 5D. During the high-level time interval t2a of the second sub-driving cycle t2, the first switch sw1 and the fourth switch sw4 are in the close state, and the second switch sw2 and the third switch sw3 are in the open state. Under this circumstance, the operation amplifier 400 is used as a unit gain amplifier, and thus the voltage outputted from the output terminal Vo is zero. In a case that the pulse amplitude of the driving signal P is Vy, the voltage across the feedback capacitor Cf is V2, which is calculated by the following formula:

$$Cs \times V1 + Cf \times V1 = (V2-Vy)Cs + V2 \times Cf$$

$$V2 = V1 + \left(\frac{Cs}{Cs+Cf}\right)Vy = 2V1 = 2\Delta V$$

Figure 5F:
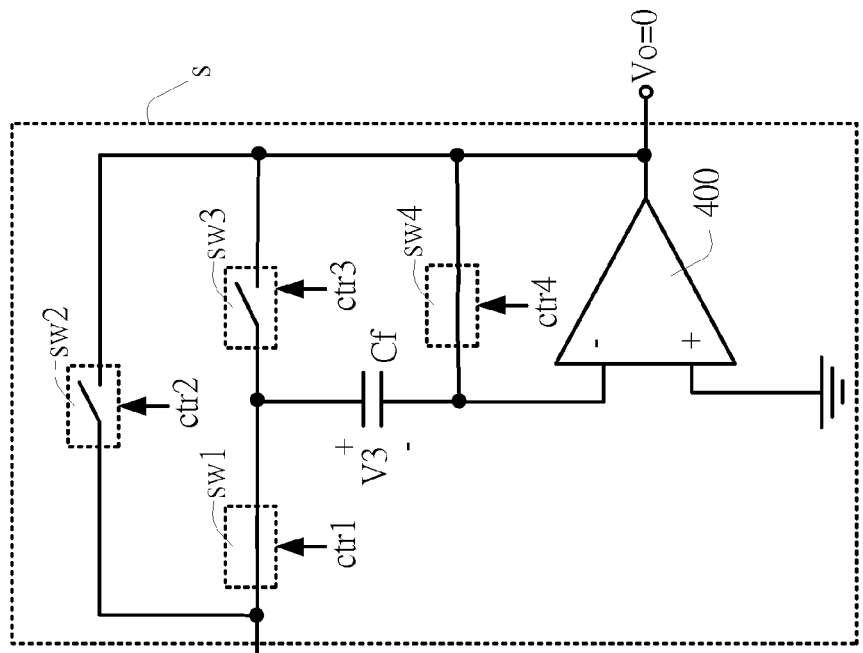
Figure 5E:
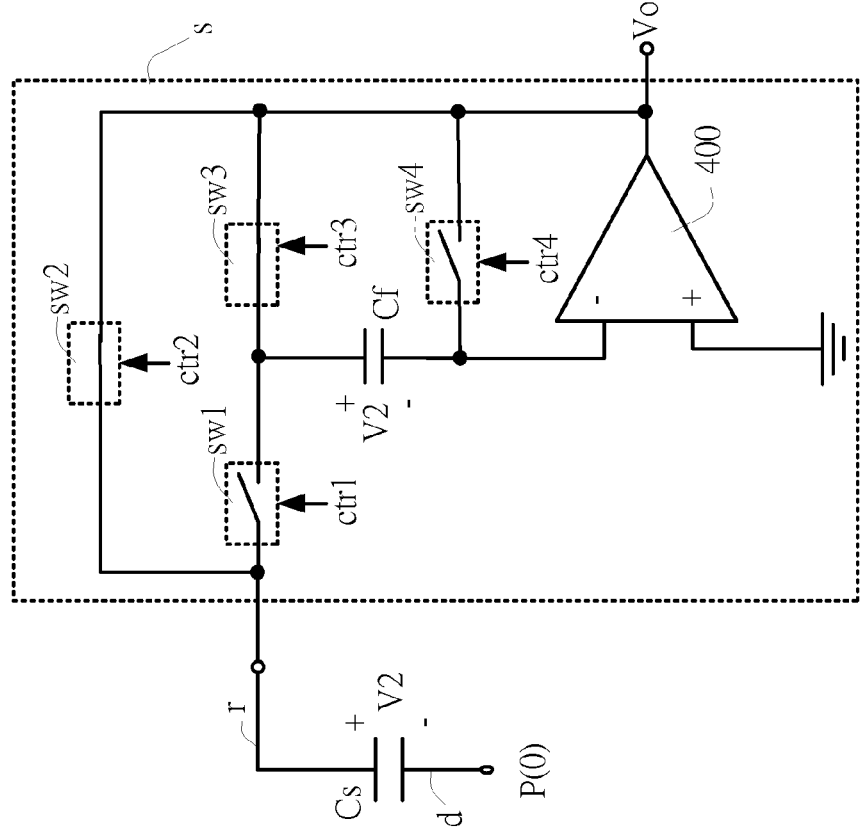

In FIG. 5E, the sensing circuit is operated during a low-level time interval t2b of the second sub-driving cycle t2 of the driving cycle T. Please refer to FIGS. 4B and 5E. During the low-level time interval t2b of the second sub-driving cycle t2, the second switch sw2 and the third switch sw3 are in the close state, and the first switch sw1 and the fourth switch sw4 are in the open state. Meanwhile, the voltage outputted from the output terminal Vo of the operation amplifier 400 is calculated by the following formula:

$$V2 = 2\Delta V = 2 \times \left(\frac{Cs}{Cs+Cf}\right)Vy$$

In addition, the voltage across the mutual capacitance Cs is also V2. Meanwhile, the charge quantity stored in the mutual capacitance Cs is equal to Cs×V2, and the charge quantity stored in the feedback capacitor Cf is equal to Cf×V2.

In FIG. 5F, the sensing circuit is operated during a high-level time interval t3a of a third sub-driving cycle t3 of the driving cycle T. Please refer to FIGS. 4B and 5F. During the high-level time interval t3a of the third sub-driving cycle t3, the first switch sw1 and the fourth switch sw4 are in the close state, and the second switch sw2 and the third switch sw3 are in the open state. Under this circumstance, the operation amplifier 400 is used as a unit gain amplifier, and thus the voltage outputted from the output terminal Vo is zero. In a case that the pulse amplitude of the driving signal P is Vy, the voltage across the feedback capacitor Cf is V3, which is calculated by the following formulae:

$$Cs \times V2 + Cf \times V2 = (V3-Vy)Cs + V3 \times Cf$$

$$V3 = V2 + \left(\frac{Cs}{Cs+Cf}\right)Vy = 3\Delta V$$

Figure 5G:
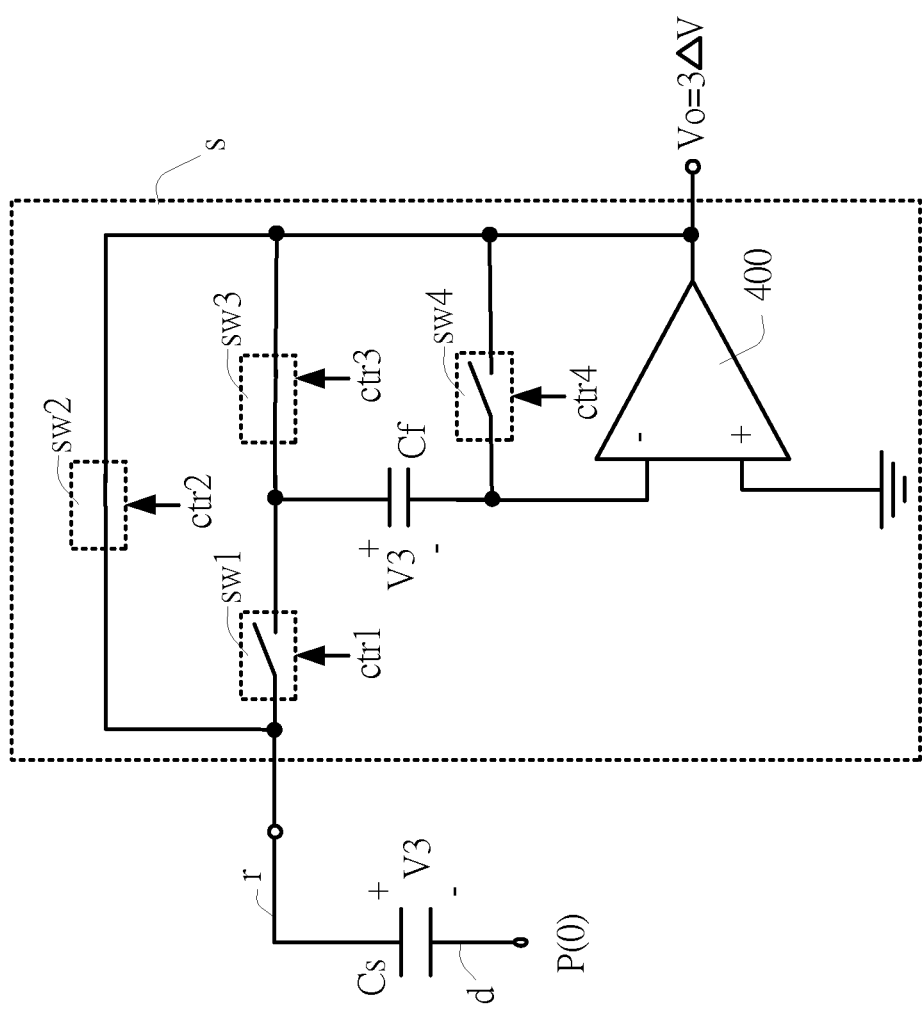

In FIG. 5G, the sensing circuit is operated during a low-level time interval t3b of the third sub-driving cycle t3 of the driving cycle T. Please refer to FIGS. 4B and 5G. During low-level time interval t3b of the third sub-driving cycle t3, the second switch sw2 and the third switch sw3 are in the close state, and the first switch sw1 and the fourth switch sw4 are in the open state. Meanwhile, the voltage outputted from the output terminal Vo of the operation amplifier 400 is calculated by the following formula:

$$V3 = 3\Delta V = 3 \times \left(\frac{Cs}{Cs+Cf}\right)Vy$$

In addition, the voltage across the mutual capacitance Cs is also V3. Meanwhile, the charge quantity stored in the mutual capacitance Cs is equal to Cs×V3. That is, during the low-level time interval of the third sub-driving cycle t3, the output voltage from the output terminal Vo of the sensing circuit s is obtained.

It is found in the first embodiment that, if N pulses are generated during the driving cycle T, a constant magnitude of charge is accumulated in the feedback capacitor Cf during the high-level state of each pulse. In other words, during the low-level time interval of the $N^{th}$ pulse, the output voltage from the output terminal Vo of the sensing circuit s may be calculated by the following formula:

$$Vo = N\Delta V = N \times \left(\frac{Cs}{Cs+Cf}\right)Vy$$

Therefore, the backend circuit can easily realize the accurate position of the touch point according to the output voltage.

Figure 6A:
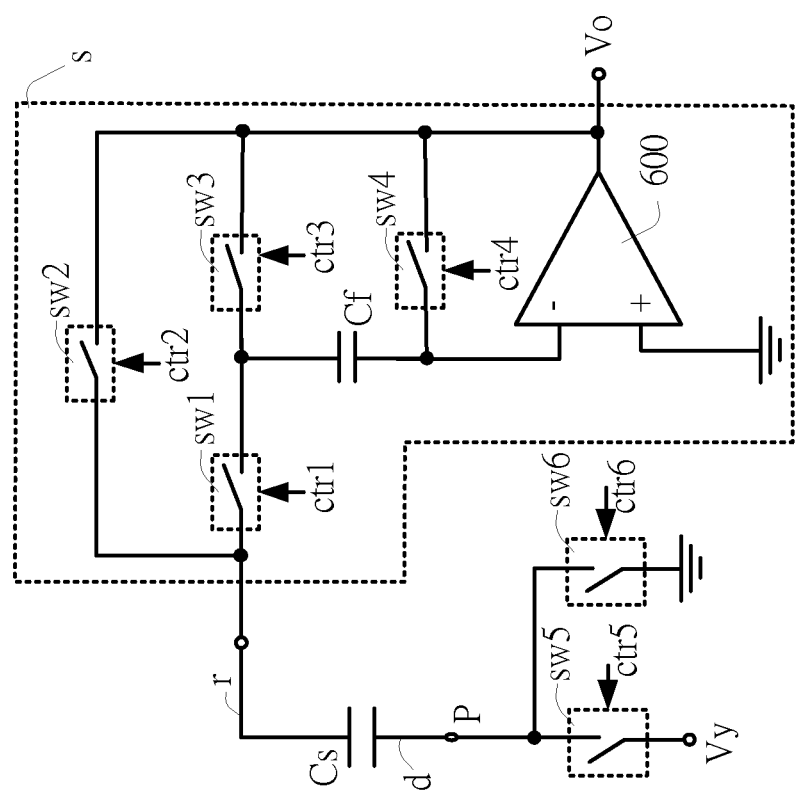
FIG. 6A is a schematic circuit diagram illustrating a sensing circuit according to a second embodiment of the present invention.
Figure 6B:
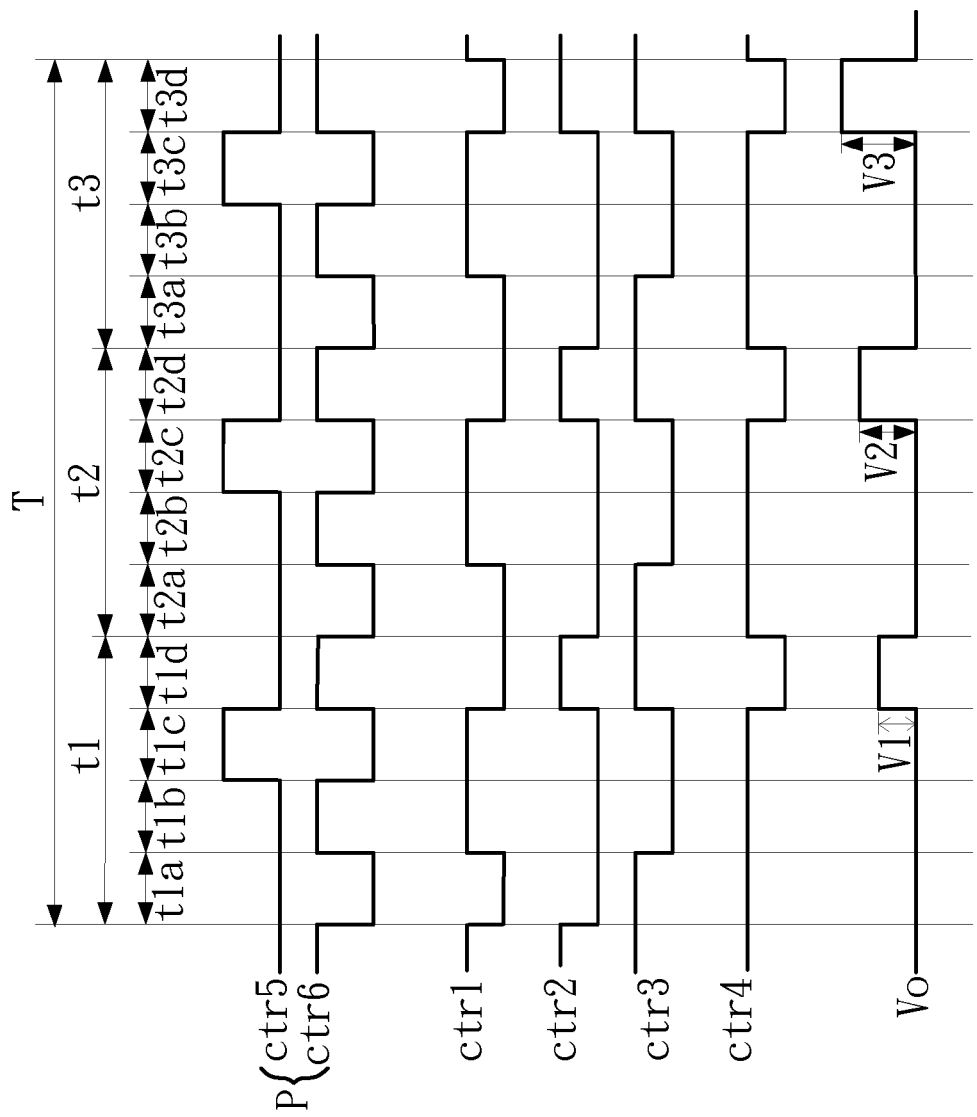
FIG. 6B is a schematic timing waveform diagram illustrating associated control signals used in the sensing circuit shown in FIG. 6A.

FIG. 6A is a schematic circuit diagram illustrating a sensing circuit according to a second embodiment of the present invention. FIG. 6B is a schematic timing waveform diagram illustrating associated control signals used in the sensing circuit shown in FIG. 6A. The sensing circuit s comprises an operation amplifier 600, a feedback capacitor Cf and four switches sw1~sw4. In this embodiment, the driving signal P is generated by selectively turning on or turning off a fifth switch sw5 and a sixth switch sw6. Moreover, the first switch sw1, the second switch sw2, the third switch sw3, the fourth switch sw4, the fifth switch sw5 and the sixth switch sw6 are controlled according to a first control signal ctr1, a second control signal ctr2, a third control signal ctr3, a fourth control signal ctr4, a fifth control signal ctr5 and a sixth control signal ctr6, respectively.

The input terminal of the sensing circuit s is connected with the first end of the first switch sw1 and the first end of the second switch sw2. The second end of the first switch sw1 is connected with the first end of the third switch sw3 and the first end of the feedback capacitor Cf. The negative input terminal (−) of the operation amplifier 600 is connected with the second end of the feedback capacitor Cf and the first end of the fourth switch sw4. The positive input terminal (+) of the operation amplifier 600 is connected with a ground terminal GND. The output terminal of the operation amplifier 600 is the output terminal Vo of the sensing circuit s. In addition, the output terminal of the operation amplifier 600 is connected with the second ends of the second switch sw2, the third switch sw3 and the fourth switch sw4.

In response to the high-level states of the six control signals ctr1~ctr6, the switches sw1~sw6 are in the close states. Whereas, in response to the low-level states of the six control signals ctr1~ctr6, the switches sw1~sw6 are in the open states. As shown in FIG. 6B, a scanning cycle τ of the driving signal P comprises a reset cycle and a driving cycle T. The driving cycle T of the driving signal P comprises three sub-driving cycles (t1, t2, t3). Each sub-driving cycle has four phases. For example, during a first phase t1a of the first sub-driving cycle t1, the fifth switch sw5 and the sixth switch sw6 are both in the open state, and thus the driving signal is in a floating condition. During a second phase t1b of the first sub-driving cycle t1, the fifth switch sw5 is in the open state and the sixth switch sw6 is in the close state, and thus the driving signal is a low-level voltage (0V). During a third phase t1c of the first sub-driving cycle t1, the fifth switch sw5 is in the close state and the sixth switch sw6 is in the open state, and thus the driving signal is a high-level voltage (Vy). During a fourth phase t1d of the first sub-driving cycle t1, the fifth switch sw5 is in the open state and the sixth switch sw6 is in the close state, and thus the driving signal is the low-level voltage (0V). The remaindering time is the reset cycle. For clarification, only three sub-driving cycles are shown in FIG. 6B. It is noted that the numbers of the sub-driving cycles of the driving cycle T may be varied according to the practical requirements.

Hereinafter, the operations of the sensing circuit s according to the second embodiment will be illustrated in more details with reference to FIGS. 6 and 7. FIGS. 7A~7M are schematic circuit diagrams illustrating the operations of the sensing circuit according to the second embodiment of the present invention.

Figure 7B:
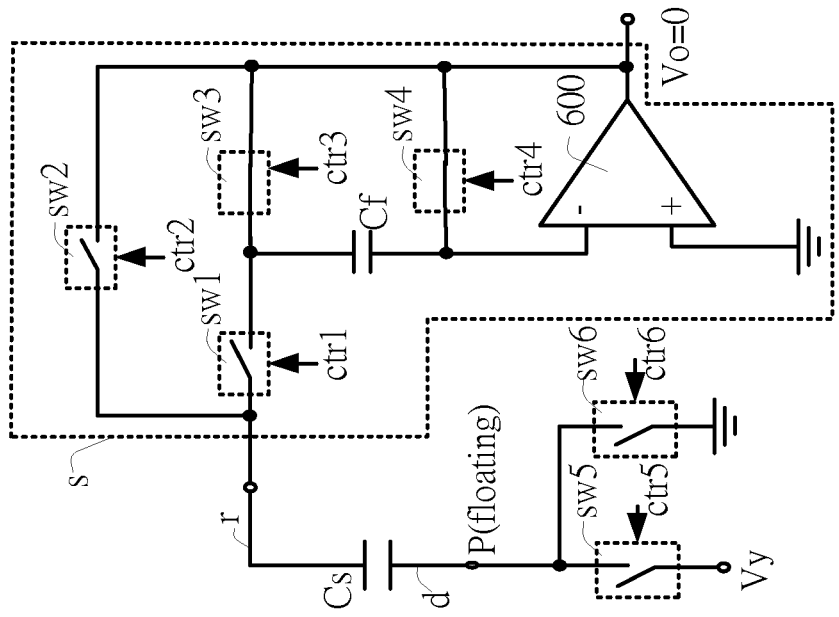
FIGS. 7A~7M are schematic circuit diagrams illustrating the operations of the sensing circuit according to the second embodiment of the present invention.
Figure 7A:
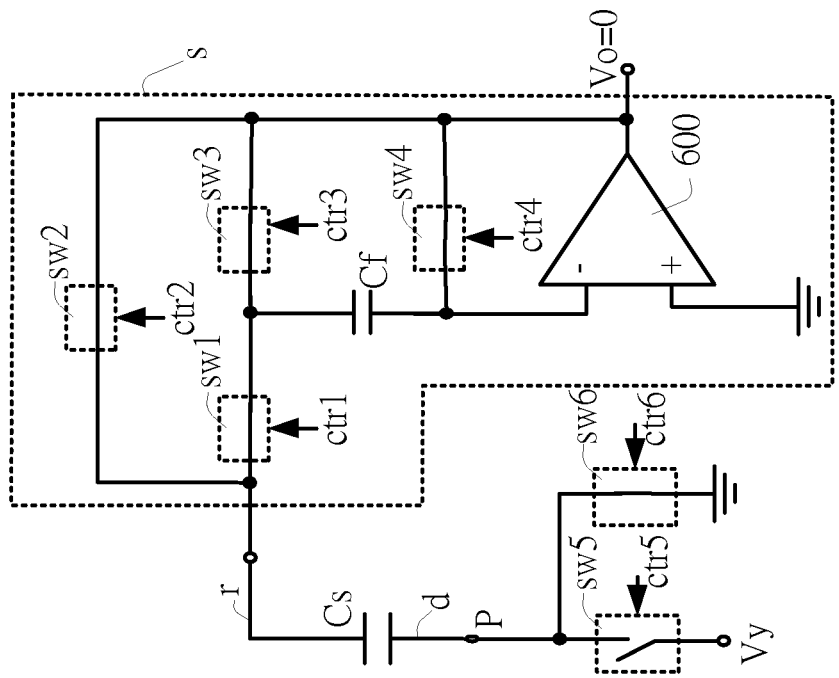

In FIG. 7A, the sensing current is operated during the reset cycle. During the reset cycle, all of the switches sw1~sw4 are in the close state, the fifth switch sw5 is in the open state, and the sixth switch sw6 is in the close state. Meanwhile, since the driving signal P is in the low-level voltage (0V) and the both terminals of the feedback capacitor Cf and the both terminals of the mutual capacitance Cs are short-circuited, the charge quantity stored in the feedback capacitor Cf and the mutual capacitance Cs will be zero. Under this circumstance, the operation amplifier 600 is used as a unit gain amplifier, and thus the voltage outputted from the output terminal Vo is zero.

In FIG. 7B, the sensing circuit is operated during the first phase t1a of the first sub-driving cycle t1 of the driving cycle T. Please refer to FIGS. 6B and 7B. During the first phase t1a of the first sub-driving cycle t1, the first switch sw1 and the second switch sw2 are in the open state, the third switch sw3 and the fourth switch sw4 are in the close state, and the driving signal is in a floating condition. Under this circumstance, the operation amplifier 600 is used as a unit gain amplifier, and thus the voltage outputted from the output terminal Vo is zero.

Figure 7D:
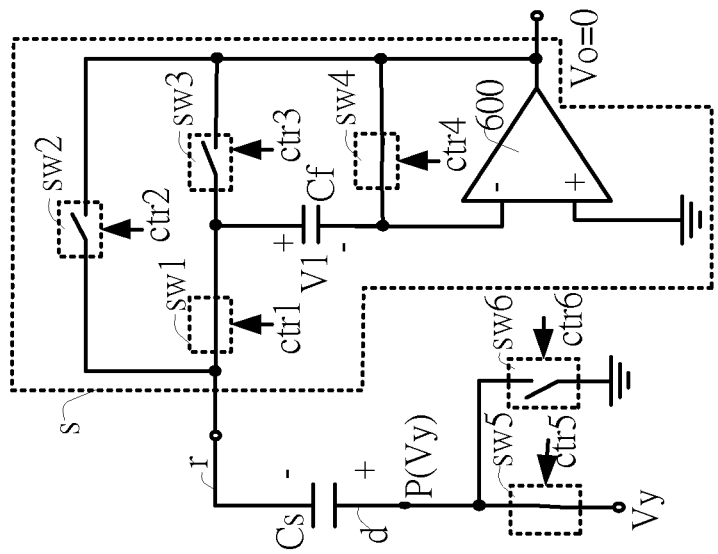
Figure 7C:
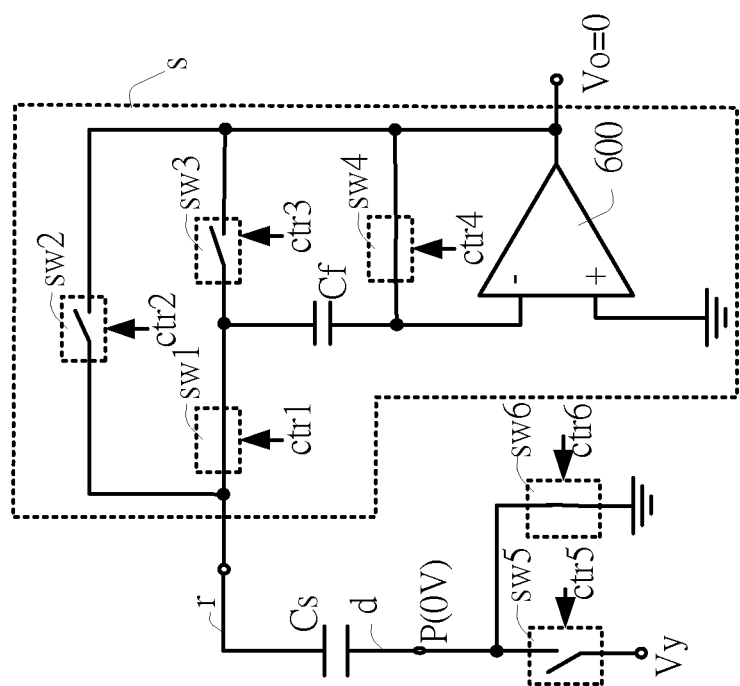

In FIG. 7C, the sensing circuit is operated during the second phase t1b of the first sub-driving cycle t1 of the driving cycle T. Please refer to FIGS. 6B and 7C. During the second phase t1b of the first sub-driving cycle t1, the first switch sw1 and the fourth switch sw4 are in the close state, the second switch sw2 and the third switch sw3 are in the open state, and the driving signal P is the low-level voltage (0V). Meanwhile, the feedback capacitor Cf and the mutual capacitance Cs are serially connected with the ground terminal. Under this circumstance, the operation amplifier 600 is used as a unit gain amplifier, and thus the voltage outputted from the output terminal Vo is zero.

In FIG. 7D, the sensing circuit is operated during the third phase t1c of the first sub-driving cycle t1 of the driving cycle T. Please refer to FIGS. 6B and 7D. During the third phase t1c of the first sub-driving cycle t1, the first switch sw1 and the fourth switch sw4 are in the close state, the second switch sw2 and the third switch sw3 are in the open state, and the driving signal is the high-level voltage (Vy). Meanwhile, the feedback capacitor Cf and the mutual capacitance Cs are serially connected with the voltage source of the high-level voltage (Vy), and the voltage across the feedback capacitor Cf is calculated by the following formula:

$$V1 = \left(\frac{Cs}{Cs+Cf}\right)Vy$$

Under this circumstance, the operation amplifier 600 is used as a unit gain amplifier, and thus the voltage outputted from the output terminal Vo is zero.

Figure 7F:
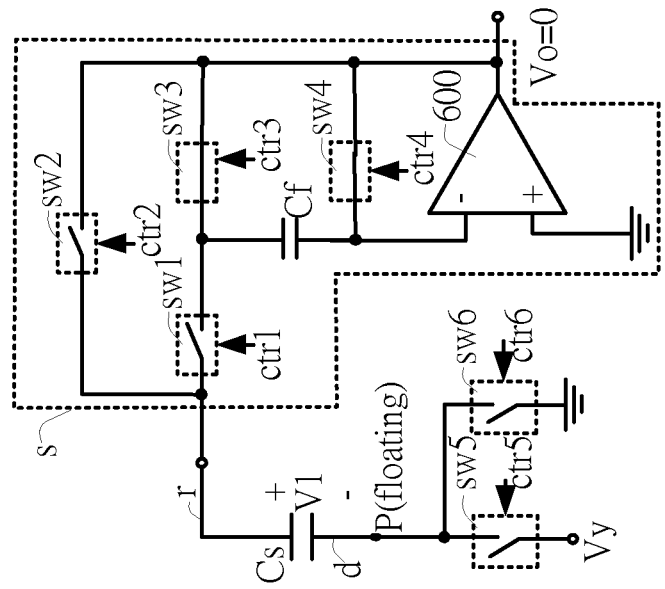
Figure 7E:
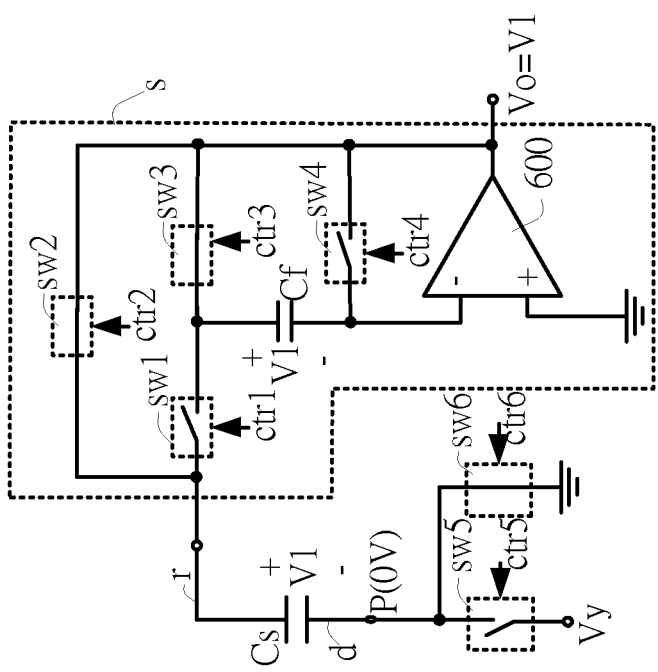

In FIG. 7E, the sensing circuit is operated during the fourth phase t1d of the first sub-driving cycle t1 of the driving cycle T. Please refer to FIGS. 6B and 7E. During the fourth phase t1d of the first sub-driving cycle t1, the first switch sw1 and the fourth switch sw4 are in the open state, the second switch sw2 and the third switch sw3 are in the close state, and the driving signal is the low-level voltage (0V).

Meanwhile, the voltage outputted from the output terminal Vo of the operation amplifier 600 is calculated by the following formula:

$$V1 = \left(\frac{Cs}{Cs+Cf}\right)Vy$$

Meanwhile, the voltage across the mutual capacitance Cs is also V1. In addition, the charge quantity stored in the mutual capacitance Cs is equal to Cs×V1, and the charge quantity stored in the feedback capacitor Cf is equal to Cf×V1.

In FIG. 7F, the sensing circuit is operated during the second phase t2a of the second sub-driving cycle t2 of the driving cycle T. Please refer to FIGS. 6B and 7F. During the second phase t2a of the second sub-driving cycle t2, the first switch sw1 and the second switch sw2 are in the open state, the third switch sw3 and the fourth switch sw4 are in the close state, and the driving signal is in a floating condition. Meanwhile, since the both terminals of the feedback capacitor Cf are short-circuited, the charge quantity stored in the feedback capacitor Cf will be zero, and the charge quantity stored in the mutual capacitance Cs is unchanged (i.e. Cs×V1). Under this circumstance, the operation amplifier 600 is used as a unit gain amplifier, and thus the voltage outputted from the output terminal Vo is zero.

Figure 7H:
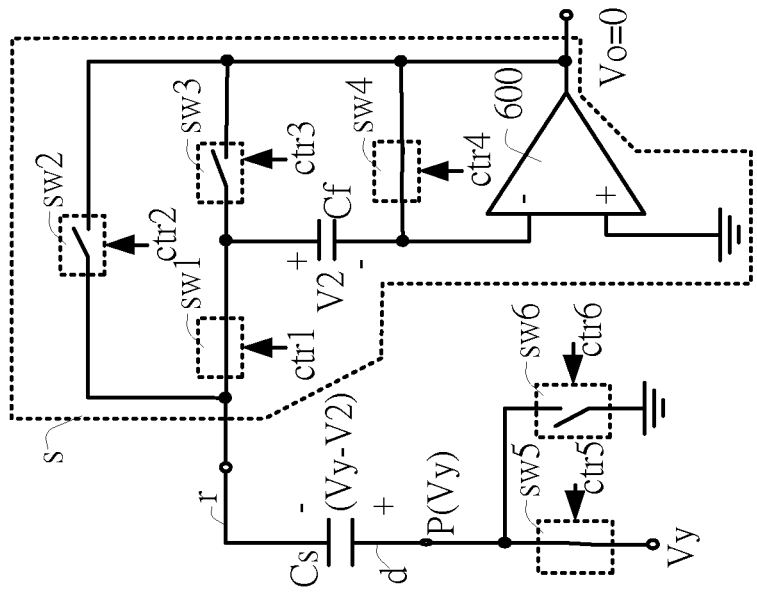
Figure 7G:
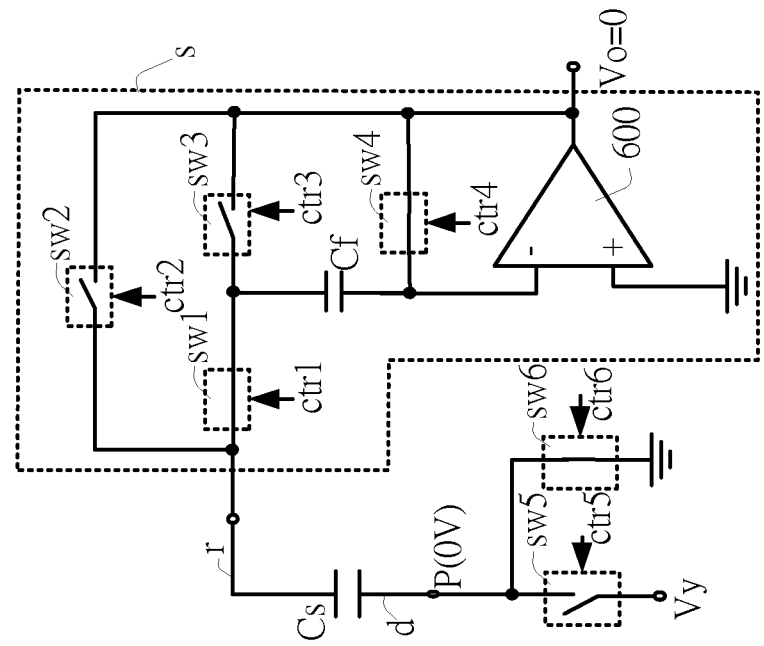

In FIG. 7G, the sensing circuit is operated during the second phase t2b of the second sub-driving cycle t2 of the driving cycle T. Please refer to FIGS. 6B and 7G. During the second phase t2b of the second sub-driving cycle t2, the first switch sw1 and the fourth switch sw4 are in the close state, the second switch sw2 and the third switch sw3 are in the open state, and the driving signal P is the low-level voltage (0V). Meanwhile, the feedback capacitor Cf and the mutual capacitance Cs are serially connected with the ground terminal. Consequently, the total charge quantity stored in the feedback capacitor Cf and the mutual capacitance Cs is equal to the Cs×V1. Under this circumstance, the operation amplifier 600 is used as a unit gain amplifier, and thus the voltage outputted from the output terminal Vo is zero.

In FIG. 7H, the sensing circuit is operated during the third phase t2c of the second sub-driving cycle t2 of the driving cycle T. Please refer to FIGS. 6B and 7H. During the third phase t2c of the second sub-driving cycle t2, the first switch sw1 and the fourth switch sw4 are in the close state, the second switch sw2 and the third switch sw3 are in the open state, and the driving signal is the high-level voltage (Vy). Meanwhile, the feedback capacitor Cf and the mutual capacitance Cs are connected with each other in series. In addition, the voltage across the feedback capacitor Cf is changed to V2, which may be calculated by the following formula:

$$Cs \times V1 = (V2 - Vy) \times Cs + V2 \times Cf$$

$$V2 = \left(\frac{Cs}{Cf+Cs}\right)V1 + \left(\frac{Cs}{Cf+Cs}\right)Vy$$

$$= \left(\frac{Cs}{Cf+Cs}\right)\left(\frac{Cs}{Cf+Cs}\right)Vy + \left(\frac{Cs}{Cf+Cs}\right)Vy$$

$$= (A^2 + A)Vy$$

where, $$A = \frac{Cs}{Cf+Cs}$$

Under this circumstance, the operation amplifier 600 is used as a unit gain amplifier, and thus the voltage outputted from the output terminal Vo is zero.

Figure 7I:
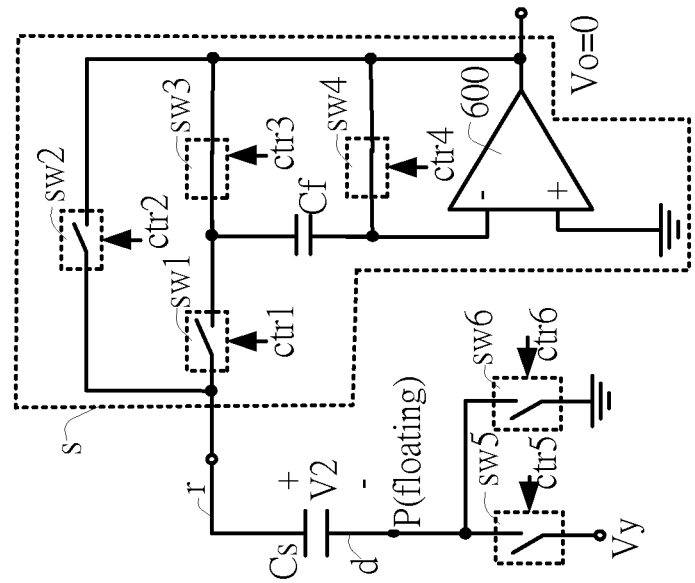

In FIG. 7I, the sensing circuit is operated during the fourth phase t2d of the second sub-driving cycle t2 of the driving cycle T. Please refer to FIGS. 6B and 7I. During the fourth phase t2d of the second sub-driving cycle t2, the first switch sw1 and the fourth switch sw4 are in the open state, the second switch sw2 and the third switch sw3 are in the close state, and the driving signal is the low-level voltage (0V). Meanwhile, the voltage outputted from the output terminal Vo is equal to V2 (i.e. V2=(A$^2$+A)Vy). In addition, the charge quantity stored in the mutual capacitance Cs is equal to Cs×V2, and the charge quantity stored in the feedback capacitor Cf is equal to Cf×V2.

Figure 7J:
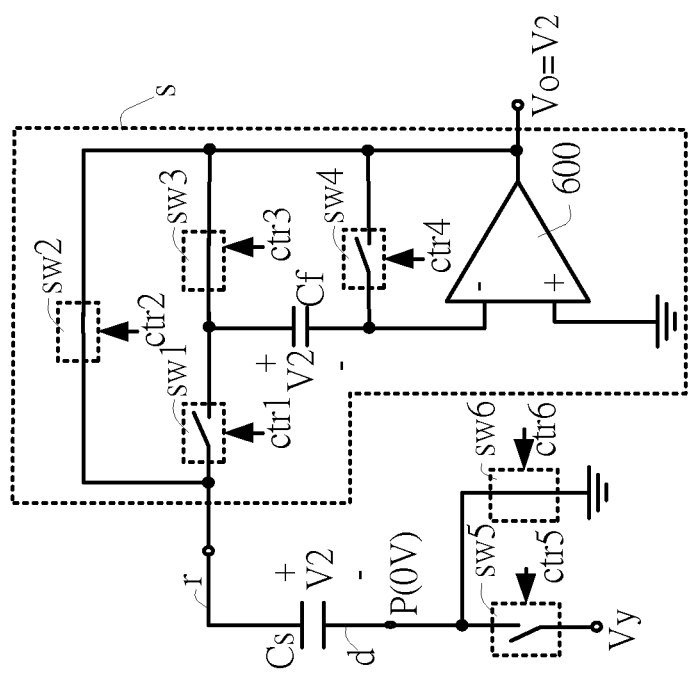

In FIG. 7J, the sensing circuit is operated during the first phase t3a of the third sub-driving cycle t3 of the driving cycle T. Please refer to FIGS. 6B and 7J. During the first phase t3a of the third sub-driving cycle t3, the first switch sw1 and the second switch sw2 are in the open state, the third switch sw3 and the fourth switch sw4 are in the close state, and the driving signal is in a floating condition. Meanwhile, since the both terminals of the feedback capacitor Cf are short-circuited, the charge quantity stored in the feedback capacitor Cf will be zero, and the charge quantity stored in the mutual capacitance Cs is unchanged (i.e. Cs×V2). Under this circumstance, the operation amplifier 600 is used as a unit gain amplifier, and thus the voltage outputted from the output terminal Vo is zero.

Figure 7L:
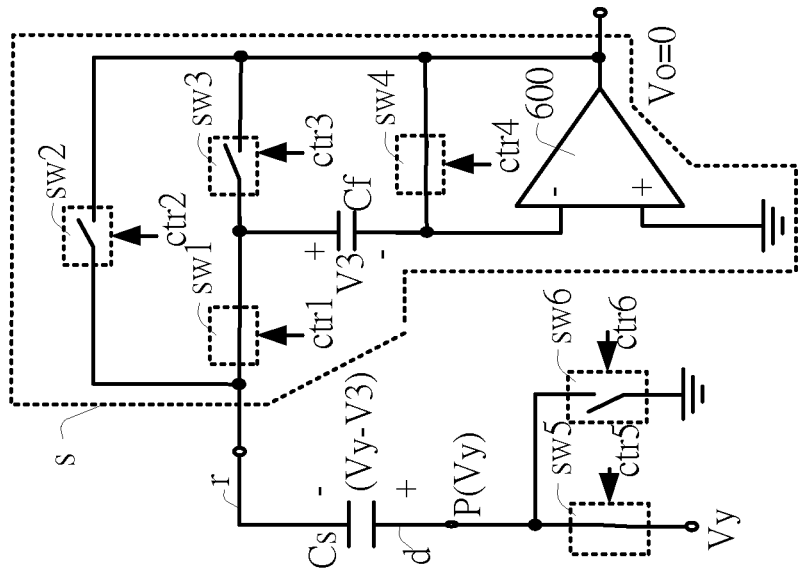
Figure 7K:
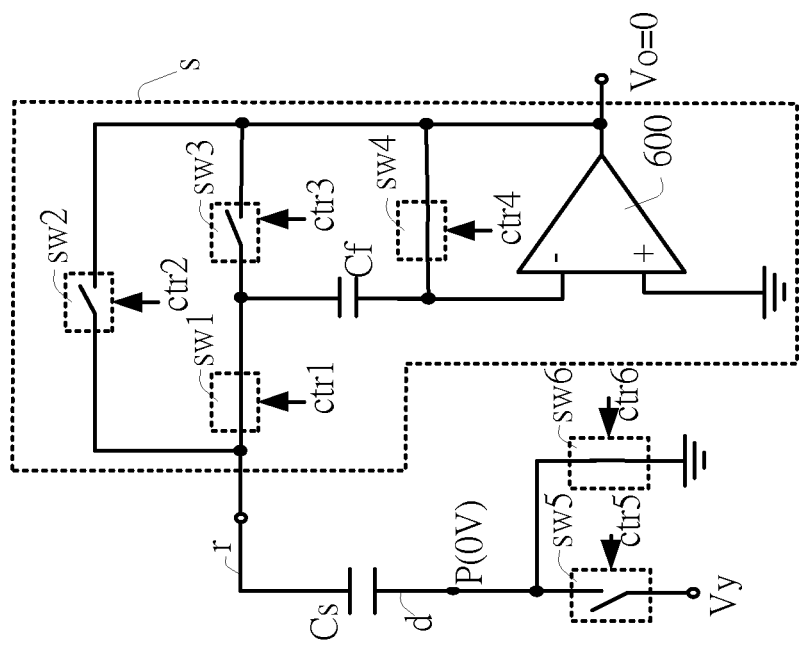

In FIG. 7K, the sensing circuit is operated during the second phase t3b of the third sub-driving cycle t3 of the driving cycle T. Please refer to FIGS. 6B and 7K. During the second phase t3b of the third sub-driving cycle t3, the first switch sw1 and the fourth switch sw4 are in the close state, the second switch sw2 and the third switch sw3 are in the open state, and the driving signal P is the low-level voltage (0V). Meanwhile, the feedback capacitor Cf and the mutual capacitance Cs are serially connected with the ground terminal. Consequently, the total charge quantity stored in the feedback capacitor Cf and the mutual capacitance Cs is equal to the Cs×V2. Under this circumstance, the operation amplifier 600 is used as a unit gain amplifier, and thus the voltage outputted from the output terminal Vo is zero.

In FIG. 7L, the sensing circuit is operated during the third phase t3c of the third sub-driving cycle t3 of the driving cycle T. Please refer to FIGS. 6B and 7L. During the third phase t3c of the third sub-driving cycle t3, the first switch sw1 and the fourth switch sw4 are in the close state, the second switch sw2 and the third switch sw3 are in the open state, and the driving signal is the high-level voltage (Vy). Meanwhile, the feedback capacitor Cf and the mutual capacitance Cs are connected with each other in series. In addition, the voltage across the feedback capacitor Cf is changed to V3, which may be calculated by the following formulae:

$$Cs \times V2 = (V3 - Vy) \times Cs + V3 \times Cf$$

$$V3 = \left(\frac{Cs}{Cf+Cs}\right)V2 + \left(\frac{Cs}{Cf+Cs}\right)Vy = (A^3 + A^2 + A)Vy$$

where, $$A = \frac{Cs}{Cf+Cs}$$

Under this circumstance, the operation amplifier 600 is used as a unit gain amplifier, and thus the voltage outputted from the output terminal Vo is zero.

Figure 7M:
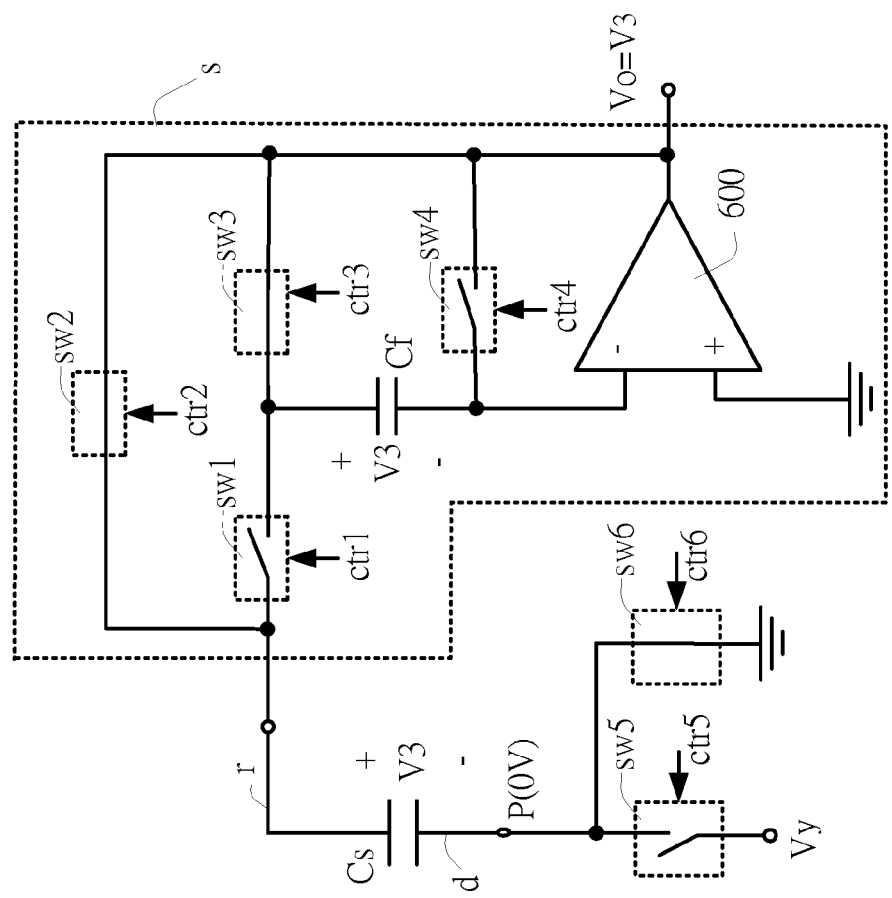

In FIG. 7M, the sensing circuit is operated during the fourth phase t3d of the third sub-driving cycle t3 of the driving cycle T. Please refer to FIGS. 6B and 7M. During the fourth phase t3d of the third sub-driving cycle t3, the first switch sw1 and the fourth switch sw4 are in the open state, the second switch sw2 and the third switch sw3 are in the close state, and the driving signal is the low-level voltage (0V). Meanwhile, the voltage outputted from the output terminal Vo is equal to V3 (i.e. V3=(A$^3$+A$^2$+A)Vy). In addition, the charge quantity stored in the mutual capacitance Cs is equal to Cs×V3, and the charge quantity stored in the feedback capacitor Cf is equal to Cf×V3. That is, during the fourth phase t3d of the third sub-driving cycle t3, the output voltage from the output terminal Vo of the sensing circuit s is obtained.

It is found in the second embodiment that, if N sub-driving cycles are included during the driving cycle T, a constant magnitude of charge is accumulated in the feedback capacitor Cf at the third phase of each sub-driving cycle. In other words, during the fourth phase of the N$^{th}$ sub-driving cycle, the output voltage from the output terminal Vo of the sensing circuit s may be calculated by the following formula:

$$Vo = (A^N + A^{N-1} + \ldots + A^3 + A^2 + A)Vy = \left(\sum_{n=1}^{N} A^n\right)Vy$$

where, $$A = \frac{Cs}{Cf+Cs}$$

Therefore, the backend circuit can easily realize the accurate position of the touch point according to the output voltage.

Figure 8A:
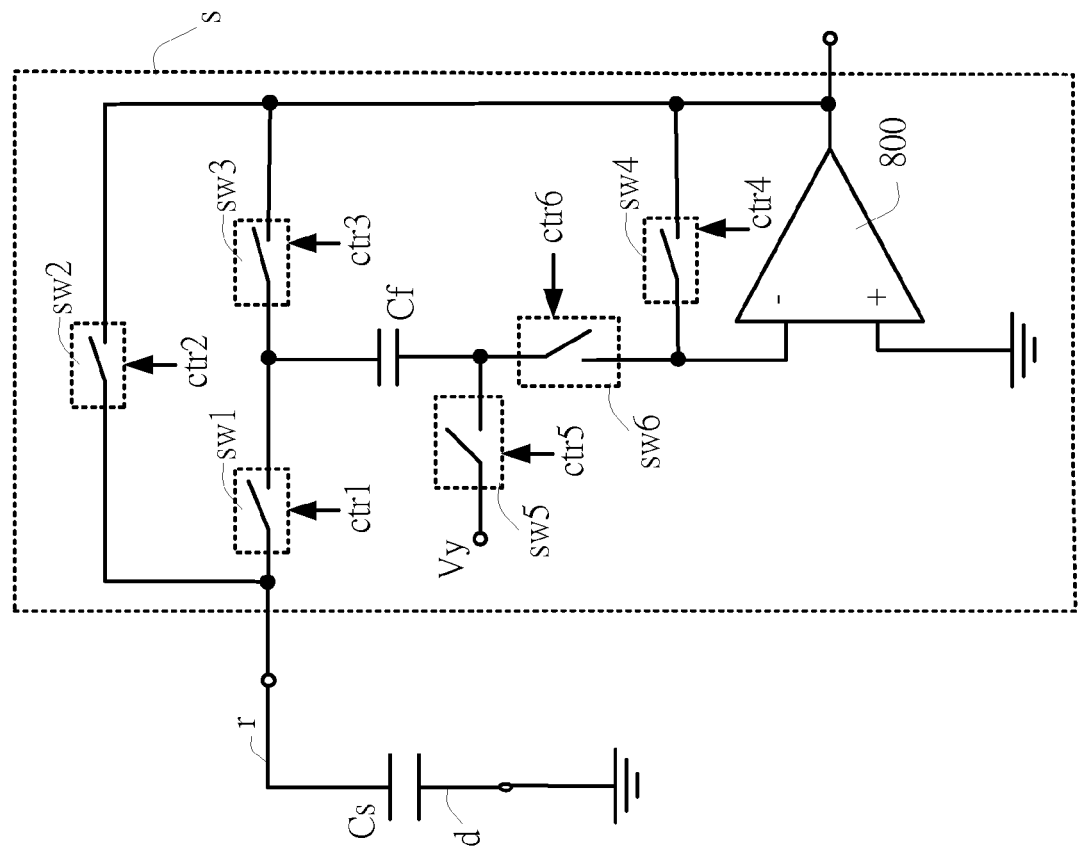
FIG. 8A is a schematic circuit diagram illustrating a sensing circuit according to a third embodiment of the present invention.
Figure 8B:
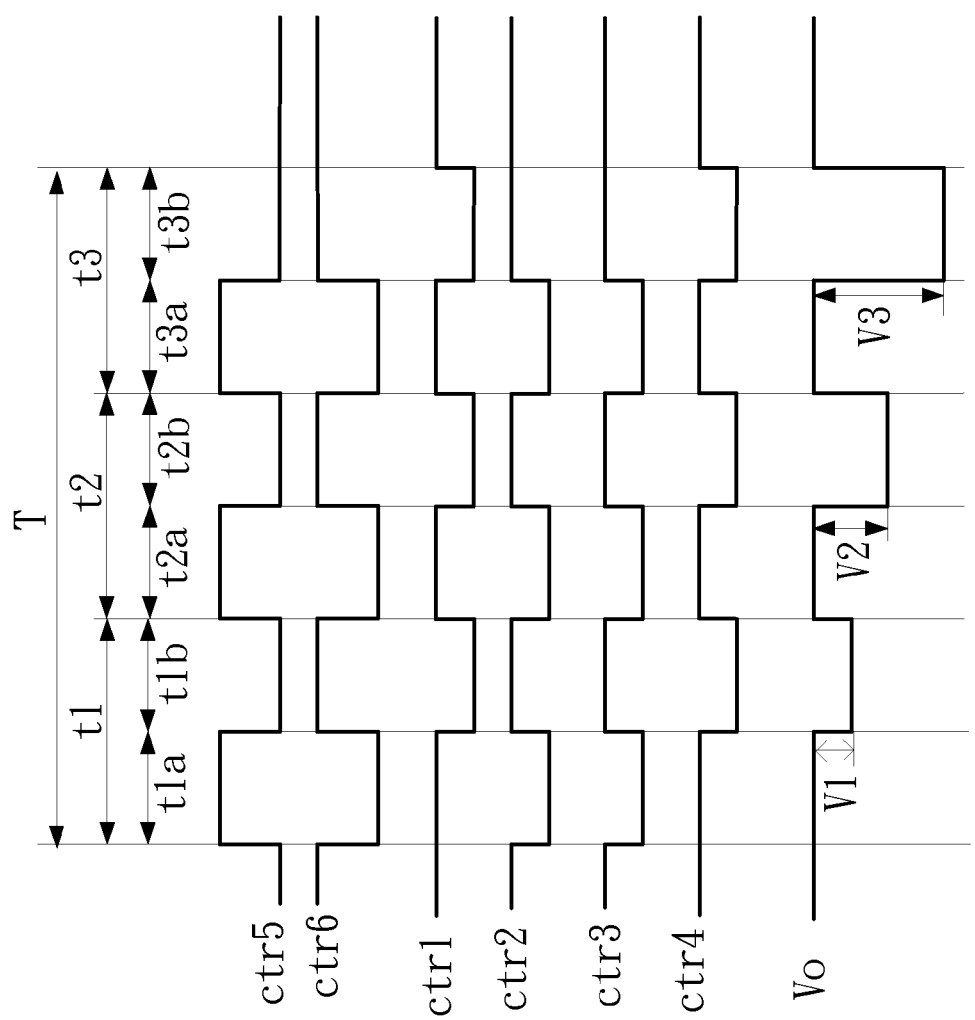
FIG. 8B is a schematic timing waveform diagram illustrating associated control signals used in the sensing circuit shown in FIG. 8A.

FIG. 8A is a schematic circuit diagram illustrating a sensing circuit according to a third embodiment of the present invention. FIG. 8B is a schematic timing waveform diagram illustrating associated control signals used in the sensing circuit shown in FIG. 8A. The sensing circuit s comprises an operation amplifier 800, a feedback capacitor Cf and six switches sw1~sw6. In this embodiment, the driving electrode d is directly connected with the ground terminal, and the receiving electrode r is connected with the input terminal of the sensing circuit. Moreover, the first switch sw1, the second switch sw2, the third switch sw3, the fourth switch sw4, the fifth switch sw5 and the sixth switch sw6 are controlled according to a first control signal ctr1, a second control signal ctr2, a third control signal ctr3, a fourth control signal ctr4, a fifth control signal ctr5 and a sixth control signal ctr6, respectively.

The input terminal of the sensing circuit s is connected with the first end of the first switch sw1 and the first end of the second switch sw2. The second end of the first switch sw1 is connected with the first end of the third switch sw3 and the first end of the feedback capacitor Cf. The first end of the fifth switch sw5 receives the voltage Vy. The second end of the fifth switch sw5 is connected with the second end of the feedback capacitor Cf and the first end of the sixth switch sw6. The negative input terminal (−) of the operation amplifier 800 is connected with the second end of the sixth switch sw6 and the first end of the fourth switch sw4. The positive input terminal (+) of the operation amplifier 800 is connected with a ground terminal GND. The output terminal of the operation amplifier 800 is the output terminal Vo of the sensing circuit s. In addition, the output terminal of the operation amplifier 800 is connected with the second ends of the second switch sw2, the third switch sw3 and the fourth switch sw4.

In response to the high-level states of the six control signals ctr1~ctr6, the switches sw1~sw6 are in the close states. Whereas, in response to the low-level states of the six control signals ctr1~ctr6, the switches sw1~sw6 are in the open states. As shown in FIG. 8B, according to the fifth control signal ctr5 and the sixth control signal ctr6, a scanning cycle τ of the driving signal P can be divided into a reset cycle and a driving cycle T. The driving cycle T of the driving signal P comprises three sub-driving cycles (t1, t2, t3). Each sub-driving cycle has two phases. For example, during a first phase t1a of the first sub-driving cycle t1, the fifth switch sw5 is in the open state, and the sixth switch sw6 is in the open state. During a second phase t1b of the first sub-driving cycle t1, the fifth switch sw5 is in the open state and the sixth switch sw6 is in the close state. For clarification, only three sub-driving cycles are shown in FIG. 8B. It is noted that the numbers of the sub-driving cycles of the driving cycle T may be varied according to the practical requirements.

Hereinafter, the operations of the sensing circuit s according to the third embodiment will be illustrated in more details with reference to FIGS. 8 and 9. FIGS. 9A~9G are schematic circuit diagrams illustrating the operations of the sensing circuit according to the third embodiment of the present invention.

Figure 9A:
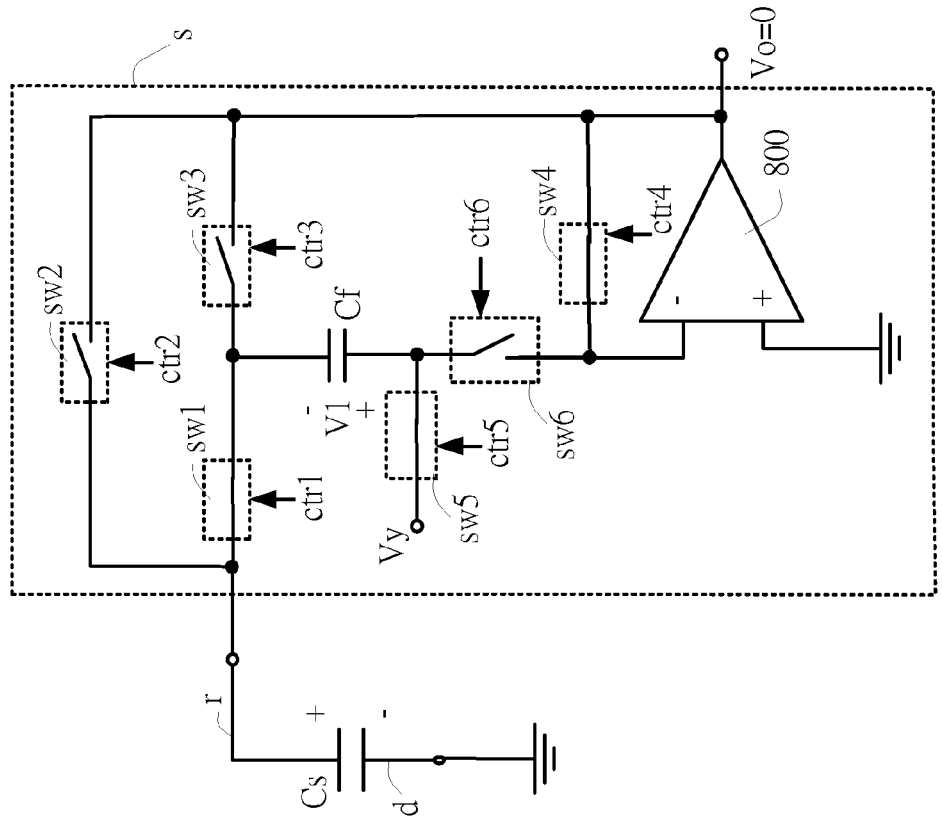
FIGS. 9A~9G are schematic circuit diagrams illustrating the operations of the sensing circuit according to the third embodiment of the present invention.

In FIG. 9A, the sensing current is operated during the reset cycle. During the reset cycle, the fifth switch sw5 is in the open state, and the switches sw1~sw4 and the sixth switch sw6 are in the close state. Since the both terminals of the feedback capacitor Cf and the both terminals of the mutual capacitance Cs are short-circuited, the charge quantity stored in the feedback capacitor Cf and the mutual capacitance Cs will be zero. Under this circumstance, the operation amplifier 800 is used as a unit gain amplifier, and thus the voltage outputted from the output terminal Vo is zero.

Figure 9B:
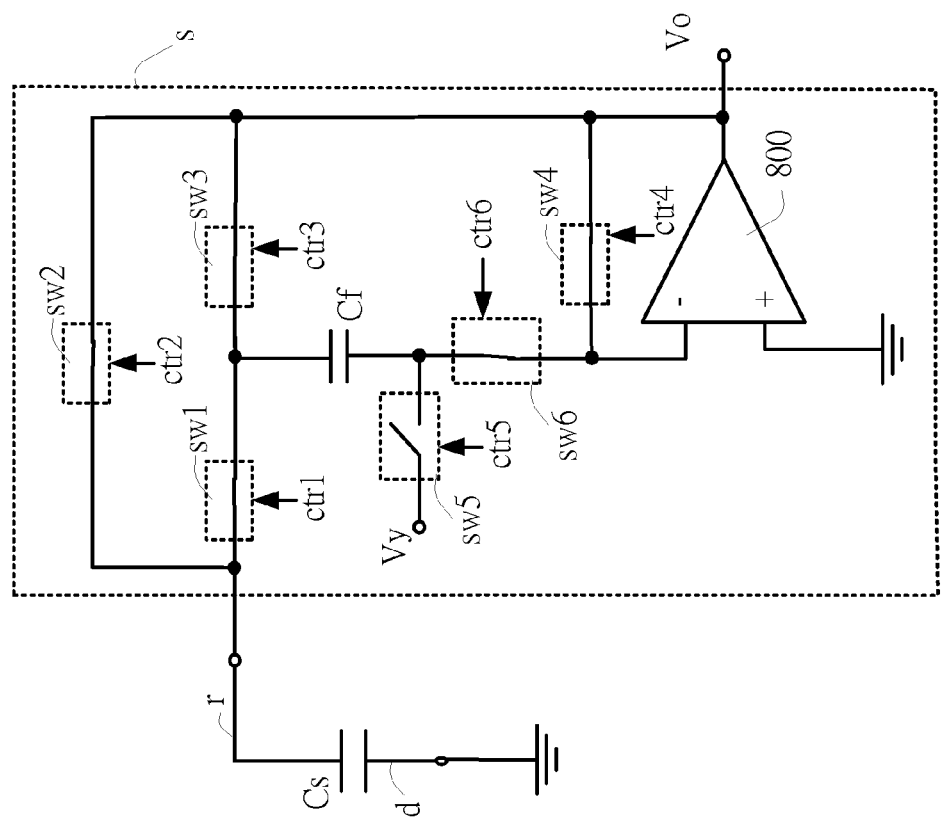

In FIG. 9B, the sensing circuit is operated during the first phase t1a of the first sub-driving cycle t1 of the driving cycle T. Please refer to FIGS. 8B and 9B. During the first phase t1a of the first sub-driving cycle t1, the first switch sw1, the fourth switch sw4 and the fifth switch sw5 are in the close state, and the second switch sw2, the third switch sw3 and the sixth switch sw6 are in the open state. Meanwhile, the voltage across the feedback capacitor Cf is calculated by the following formula:

$$V1 = \left(\frac{Cs}{Cs + Cf}\right)Vy$$

Under this circumstance, the operation amplifier 800 is used as a unit gain amplifier, and thus the voltage outputted from the output terminal Vo is zero.

Figure 9D:
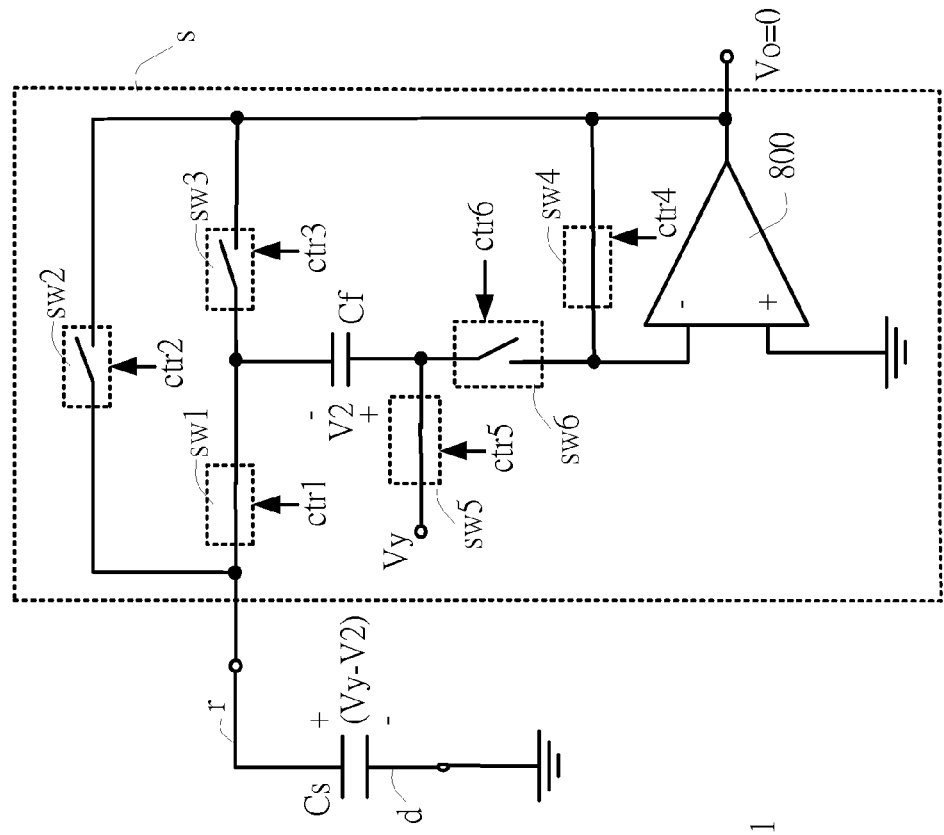
Figure 9C:
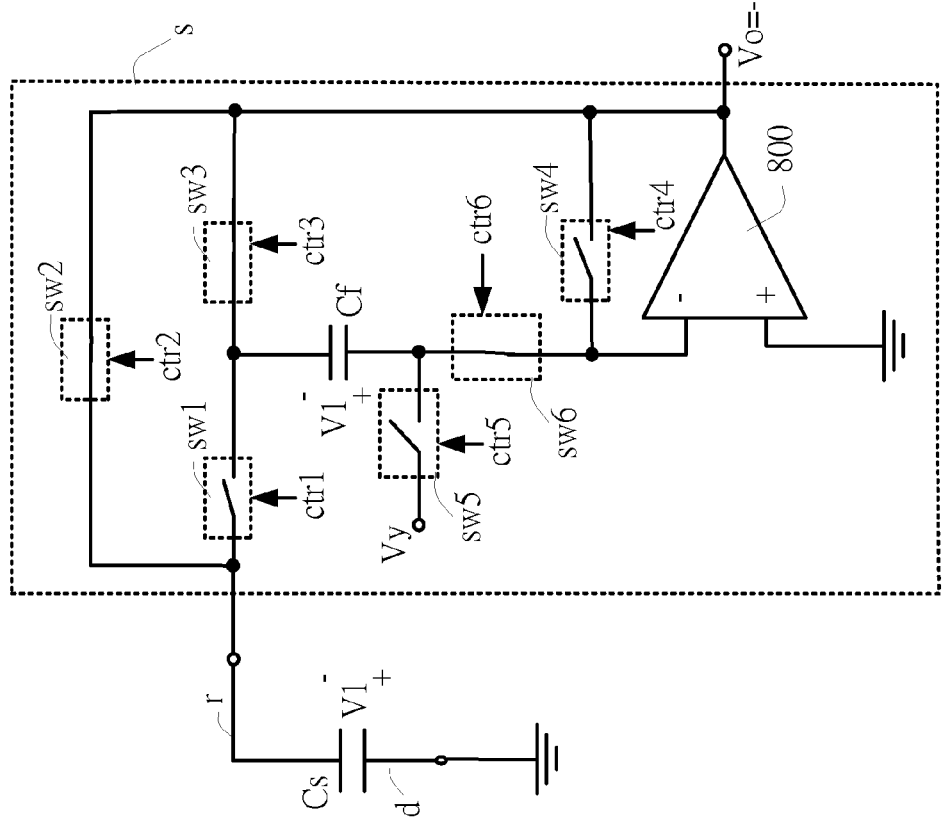

In FIG. 9C, the sensing circuit is operated during the second phase t1b of the first sub-driving cycle t1 of the driving cycle T. Please refer to FIGS. 8B and 9C. During the second phase t1b of the first sub-driving cycle t1, the first switch sw1, the fourth switch sw4 and the fifth switch sw5 are in the open state, and the second switch sw2, the third switch sw3 and the sixth switch sw6 are in the close state. Meanwhile, the voltage outputted from the output terminal Vo of the operation amplifier 800 is calculated by the following formula:

$$Vo = -V1 = \left(\frac{Cs}{Cs + Cf}\right)Vy$$

In addition, the voltage across the mutual capacitance Cs is also V1. Consequently, the charge quantity stored in the mutual capacitance Cs is equal to Cs×V1, and the charge quantity stored in the feedback capacitor Cf is equal to Cf×V1.

In FIG. 9D, the sensing circuit is operated during the first phase t2a of the second sub-driving cycle t2 of the driving cycle T. Please refer to FIGS. 8B and 9D. During the second phase t2a of the second sub-driving cycle t2, the first switch sw1, the fourth switch sw4 and the fifth switch sw5 are in the close state, and the second switch sw2, the third switch sw3 and the sixth switch sw6 are in the open state. Meanwhile, the voltage across the feedback capacitor Cf is changed to V2, which may be calculated by the following formulae:

$$(Cf + Cs) \times V1 = (V2 - Vy) \times Cs + V2 \times Cf$$

$$V2 = V1 + \left(\frac{Cs}{Cf + Cs}\right)Vy = 2\left(\frac{Cs}{Cf + Cs}\right)Vy$$

Under this circumstance, the operation amplifier 800 is used as a unit gain amplifier, and thus the voltage outputted from the output terminal Vo is zero.

Figure 9F:
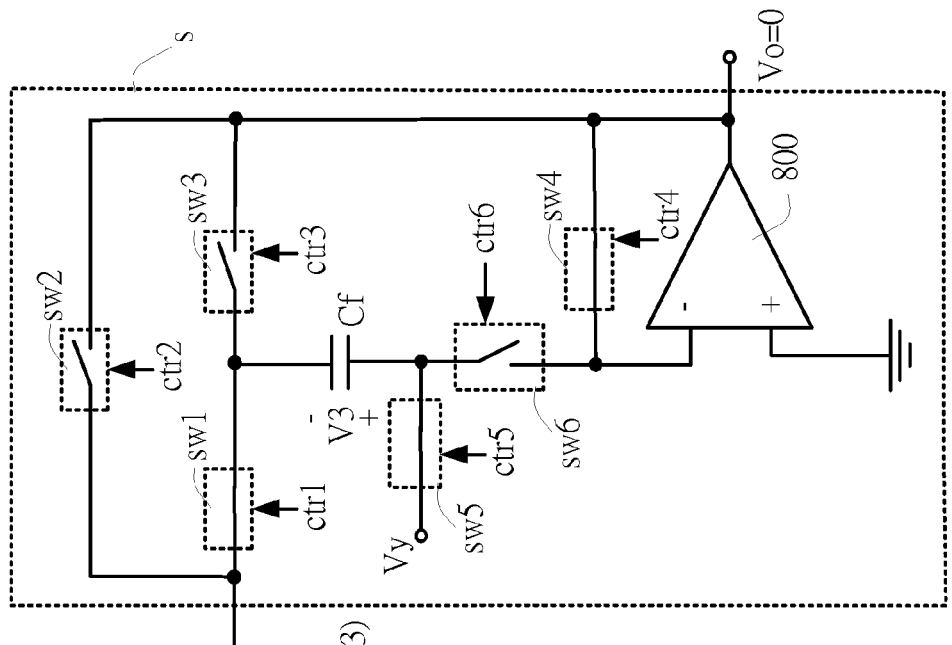
Figure 9E:
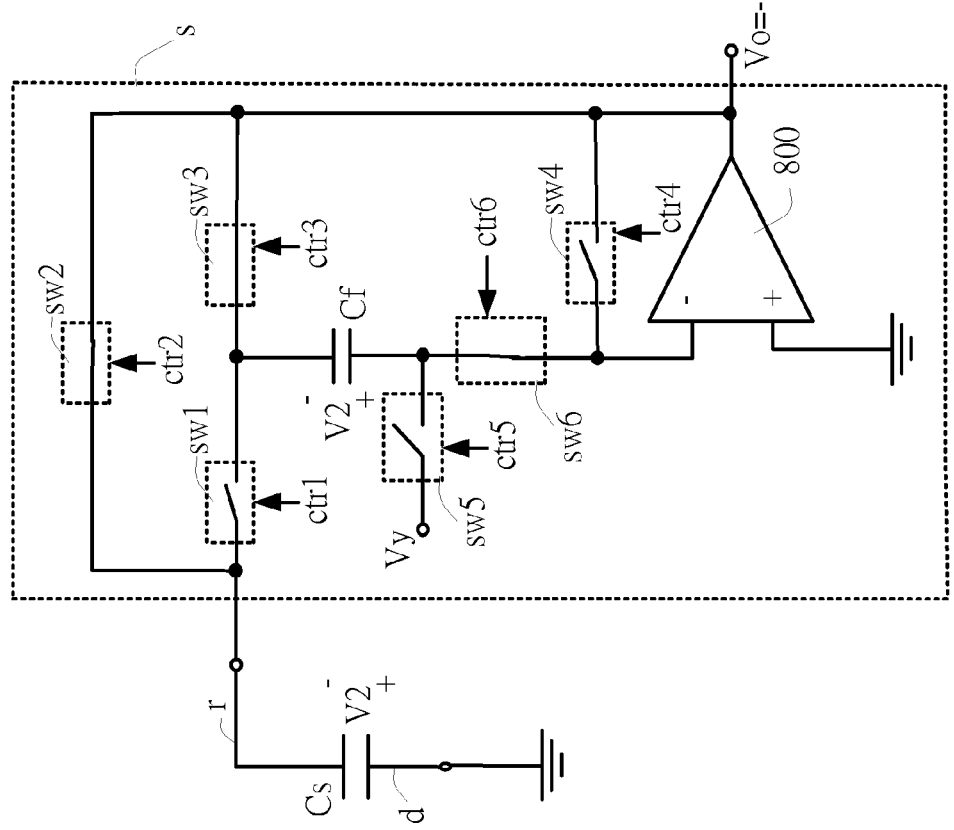

In FIG. 9E, the sensing circuit is operated during the second phase t2b of the second sub-driving cycle t2 of the driving cycle T. Please refer to FIGS. 8B and 9E. During the second phase t2b of the second sub-driving cycle t2, the first switch sw1, the fourth switch sw4 and the fifth switch sw5 are in the open state, and the second switch sw2, the third switch sw3 and the sixth switch sw6 are in the close state. Meanwhile, the voltage outputted from the output terminal Vo of the operation amplifier 800 is calculated by the following formula:

$$Vo = -V2 = -2\left(\frac{Cs}{Cs+Cf}\right)Vy$$

In addition, the voltage across the mutual capacitance Cs is also V2. Consequently, the charge quantity stored in the mutual capacitance Cs is equal to Cs×V2, and the charge quantity stored in the feedback capacitor Cf is equal to Cf×V2.

In FIG. 9F, the sensing circuit is operated during the first phase t3a of the third sub-driving cycle t3 of the driving cycle T. Please refer to FIGS. 8B and 9F. During the s first phase t3a of the third sub-driving cycle t3, the first switch sw1, the fourth switch sw4 and the fifth switch sw5 are in the close state, and the second switch sw2, the third switch sw3 and the sixth switch sw6 are in the open state. Meanwhile, the voltage across the feedback capacitor Cf is changed to V3, which may be calculated by the following formulae:

$$(Cf + Cs) \times V2 = (V3 - Vy) \times Cs + V3 \times Cf$$

$$V3 = V2 + \left(\frac{Cs}{Cf+Cs}\right)Vy = 3\left(\frac{Cs}{Cf+Cs}\right)Vy$$

Under this circumstance, the operation amplifier 800 is used as a unit gain amplifier, and thus the voltage outputted from the output terminal Vo is zero.

Figure 9G:
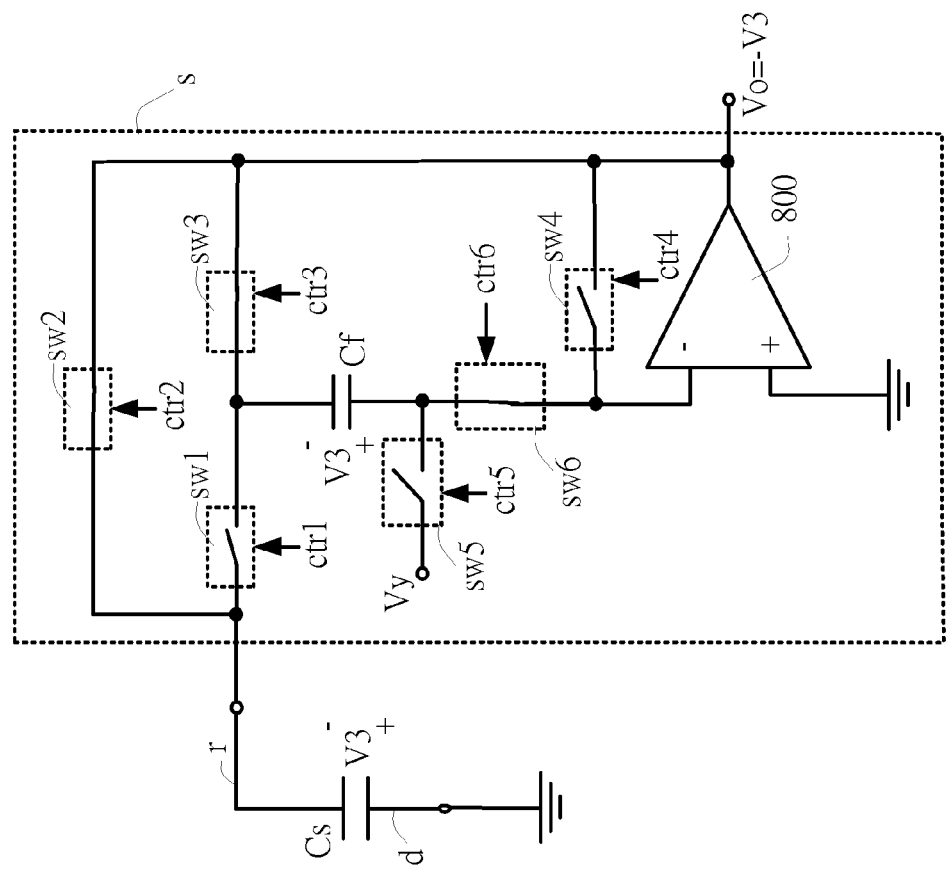

In FIG. 9G, the sensing circuit is operated during the second phase t3b of the third sub-driving cycle t3 of the driving cycle T. Please refer to FIGS. 8B and 9G. During the second phase t3b of the third sub-driving cycle t3, the first switch sw1, the fourth switch sw4 and the fifth switch sw5 are in the open state, and the second switch sw2, the third switch sw3 and the sixth switch sw6 are in the close state. Meanwhile, the voltage outputted from the output terminal Vo of the operation amplifier 800 is calculated by the following formula:

$$Vo = -V3 = -3\left(\frac{Cs}{Cs+Cf}\right)Vy$$

In addition, the voltage across the mutual capacitance Cs is also V3.

It is found in the third embodiment that, if N sub-driving cycles are included during the driving cycle T, a constant magnitude of charge is accumulated in the feedback capacitor Cf at the first phase of each sub-driving cycle. In other words, during the second phase of the $N^{th}$ sub-driving cycle, the output voltage from the output terminal Vo of the sensing circuit s may be calculated by the following formula:

$$Vo = -N\left(\frac{Cs}{Cf+Cs}\right)Vy$$

Therefore, the backend circuit can easily realize the accurate position of the touch point according to the output voltage.

In the above embodiments, since the output voltage from the output terminal of the sensing circuit s is increased during the driving cycle, the backend circuit can easily distinguish the voltage change between the touch point and the non-touch point, thereby accurately determining the position of the touch point. Therefore, the sensitivity of the touch panel is enhanced.

From the above description, the sensing circuit of the capacitive touch panel of the present invention is capable of generating a high voltage change at the output terminal. As a consequence, the signal-to-noise ratio (SNR) is increased. The backend circuit may easily realize the position of the touch point according to the output change of the sensing circuit. Therefore, the sensing capability of the touch panel is largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sensing circuit for a capacitive touch panel, connected with a receiving electrode of the capacitive touch panel, wherein a mutual capacitance is existed between a driving electrode of the capacitive touch panel and the receiving electrode, and the driving electrode receives a driving signal, the sensing circuit comprising:

a first switch, having a first end connected with the receiving electrode;

a second switch, having a first end connected with the receiving electrode;

a third switch, having a first end connected with a second end of the first switch;

a feedback capacitor, having a first end connected with the second end of the first switch;

a fourth switch, having a first end connected with a second end of the feedback capacitor; and an operation amplifier, having a positive input terminal connected with a ground terminal, a negative input terminal connected with the first end of the fourth switch, and an output terminal connected with a second end of the second switch, a second end of the third switch and a second end of the fourth switch, wherein a driving cycle of the driving signal includes N sub-driving cycles, when the sensing circuit is operated during high-level time intervals of the N sub-driving cycles, the first switch and the fourth switch are in the close state, and the second switch and the third switch are in the open state, otherwise, when the sensing circuit is operated during low-level time intervals of the N sub-driving cycles, the first switch and the fourth switch are in the open state, and the second switch and the third switch are in the close state, then an output voltage is generated from the output terminal of the operation amplifier during the low-level time interval of the $N^{th}$ sub-driving cycle, where N is an integer.

2. The sensing circuit according to claim 1, wherein the driving signal includes the driving cycle and a reset cycle.

3. The sensing circuit according to claim 2, wherein during the reset cycle, the first switch, the second switch, the third switch and the fourth switch are controlled to be in the close state, so that there is no charge quantity stored in the feedback capacitor and the mutual capacitance.

4. The sensing circuit according to claim 2, wherein the output voltage generated during the low-level time interval of the N$^{th}$ sub-driving cycle is N times as large as the output voltage generated during the low-level time interval of the first sub-driving cycle.

5. The sensing circuit according to claim 1, wherein the output voltage is obtained as:

$$N \times \left(\frac{Cs}{Cs + Cf}\right) Vy$$

where, Cs is the capacitance value of the mutual capacitance, Cf is the capacitance value of the feedback capacitor, and Vy is a pulse amplitude of the driving signal.

* * * * *